United States Patent
McCloud

(10) Patent No.: US 11,299,213 B2
(45) Date of Patent: Apr. 12, 2022

(54) JOINING A RAIL MEMBER TO A COMPOSITE TRAILER STRUCTURE

(71) Applicant: Wabash National, L.P., Lafayette, IN (US)

(72) Inventor: Travis Smith McCloud, Cadiz, KY (US)

(73) Assignee: Wabash National, L.P., Lafayette, IN (US)

( * ) Notice: Subject to any disclaimer, the term of this patent is extended or adjusted under 35 U.S.C. 154(b) by 8 days.

(21) Appl. No.: 16/729,915

(22) Filed: Dec. 30, 2019

(65) Prior Publication Data

US 2020/0130752 A1 Apr. 30, 2020

Related U.S. Application Data

(62) Division of application No. 15/758,341, filed as application No. PCT/US2016/050509 on Sep. 7, 2016, now Pat. No. 10,549,789.

(60) Provisional application No. 62/215,671, filed on Sep. 8, 2015.

(51) Int. Cl.
| | |
|---|---|
| *B62D 29/00* | (2006.01) |
| *B62D 33/04* | (2006.01) |
| *B62D 21/20* | (2006.01) |
| *B62D 29/04* | (2006.01) |
| *B62D 21/09* | (2006.01) |
| *B62D 25/20* | (2006.01) |
| *B62D 27/02* | (2006.01) |

(Continued)

(52) U.S. Cl.
CPC .......... *B62D 29/001* (2013.01); *B62D 21/09* (2013.01); *B62D 21/20* (2013.01); *B62D 25/2054* (2013.01); *B62D 27/026* (2013.01); *B62D 27/06* (2013.01); *B62D 29/043* (2013.01); *B62D 33/046* (2013.01); *B62D 65/024* (2013.01)

(58) Field of Classification Search
CPC ...................................................... B62D 29/001
USPC ............................................... 296/184.1, 180
See application file for complete search history.

(56) References Cited

U.S. PATENT DOCUMENTS

| | | | |
|---|---|---|---|
| 1,552,585 A * | 9/1925 | Synck | A01C 3/06 296/180 |
| 3,557,992 A | 1/1971 | Reeves | |
| 3,637,252 A | 1/1972 | Metsker | |

(Continued)

FOREIGN PATENT DOCUMENTS

| | | |
|---|---|---|
| AU | 07132/60 B2 | 11/1999 |
| CA | 1329818 C | 5/1994 |

(Continued)

OTHER PUBLICATIONS

Black, Sara, "Structural adhesives, Part I: Industrial," CompositesWorld, posted Apr. 11, 2016, 7 pages.

(Continued)

*Primary Examiner* — Dennis H Pedder
(74) *Attorney, Agent, or Firm* — Faegre Drinker Biddle & Reath LLP

(57) ABSTRACT

A cargo vehicle configured to support cargo includes a frame assembly with at least one rail member defining a portion of an outer perimeter of the trailer. The cargo vehicle also includes a composite member adjacent to the frame assembly and a mounting member removably coupled to the at least one rail member and permanently coupled to the composite member.

22 Claims, 19 Drawing Sheets

(51) Int. Cl.
  *B62D 27/06* (2006.01)
  *B62D 65/02* (2006.01)

(56) References Cited

U.S. PATENT DOCUMENTS

| | | | |
|---|---|---|---|
| 3,705,732 A * | 12/1972 | Marinelli | B62D 33/02 |
| | | | 280/789 |
| 4,049,285 A * | 9/1977 | Chieger | B62D 29/008 |
| | | | 280/789 |
| 4,399,642 A | 8/1983 | Bard et al. | |
| 4,418,507 A | 12/1983 | Roberts et al. | |
| 4,498,264 A | 2/1985 | McCafferty et al. | |
| 4,685,720 A | 8/1987 | Oren et al. | |
| 4,758,299 A | 7/1988 | Burke | |
| 4,976,490 A | 12/1990 | Gentle | |
| 5,403,063 A | 4/1995 | Sjostedt et al. | |
| 5,429,066 A | 7/1995 | Lewit et al. | |
| 5,507,405 A | 4/1996 | Thomas et al. | |
| 5,562,981 A | 10/1996 | Ehrlich | |
| 5,588,693 A | 12/1996 | Higginson et al. | |
| 5,664,518 A | 9/1997 | Lewit et al. | |
| 5,700,118 A | 12/1997 | Bennett et al. | |
| 5,765,639 A | 6/1998 | Muth | |
| 5,772,276 A | 6/1998 | Fetz et al. | |
| 5,800,749 A | 9/1998 | Lewit et al. | |
| 5,802,984 A | 9/1998 | Thoman et al. | |
| 5,830,308 A | 11/1998 | Reichard | |
| 5,860,668 A | 1/1999 | Hull et al. | |
| 5,860,693 A | 1/1999 | Ehrlich | |
| 5,890,435 A | 4/1999 | Thoman et al. | |
| 5,897,818 A | 4/1999 | Lewit et al. | |
| 5,908,591 A | 6/1999 | Lewit et al. | |
| 5,916,093 A | 6/1999 | Fecko et al. | |
| 5,979,684 A | 11/1999 | Ohnishi et al. | |
| 5,992,117 A | 11/1999 | Schmidt | |
| 6,004,492 A | 12/1999 | Lewit et al. | |
| 6,013,213 A | 1/2000 | Lewit et al. | |
| 6,076,693 A | 6/2000 | Reiter et al. | |
| 6,082,810 A | 7/2000 | Bennett | |
| 6,092,472 A | 7/2000 | Thoman et al. | |
| 6,199,939 B1 | 3/2001 | Ehrlich | |
| 6,206,669 B1 | 3/2001 | Lewit et al. | |
| 6,220,651 B1 | 4/2001 | Ehrlich | |
| 6,227,125 B1 | 5/2001 | Schroeder et al. | |
| 6,247,747 B1 | 6/2001 | Kawanomoto et al. | |
| 6,318,794 B1 | 11/2001 | Berube | |
| 6,349,988 B1 | 2/2002 | Foster et al. | |
| 6,374,546 B1 | 4/2002 | Fecko et al. | |
| 6,496,190 B1 | 12/2002 | Driemeyer et al. | |
| 6,497,190 B1 | 12/2002 | Lewit | |
| 6,505,883 B1 | 1/2003 | Ehrlich | |
| 6,543,469 B2 | 4/2003 | Lewit et al. | |
| 6,615,741 B2 | 9/2003 | Fecko et al. | |
| 6,626,622 B2 | 9/2003 | Zubko | |
| 6,688,835 B1 | 2/2004 | Buher | |
| 6,723,273 B2 | 4/2004 | Johnson et al. | |
| 6,740,381 B2 | 5/2004 | Day et al. | |
| 6,745,470 B2 | 6/2004 | Foster et al. | |
| 6,755,998 B1 | 6/2004 | Reichard et al. | |
| 6,761,840 B2 | 7/2004 | Fecko et al. | |
| 6,824,341 B2 | 11/2004 | Ehrlich | |
| 6,843,525 B2 | 1/2005 | Preisler | |
| 6,854,791 B1 | 2/2005 | Jaggi | |
| 6,863,339 B2 | 3/2005 | Boehm et al. | |
| 6,869,561 B2 | 3/2005 | Johnson et al. | |
| 6,877,940 B2 | 4/2005 | Nelson et al. | |
| 6,893,075 B2 | 5/2005 | Fenton et al. | |
| 6,911,252 B2 | 6/2005 | Lewit et al. | |
| 6,986,546 B2 | 1/2006 | Ehrlich | |
| 7,000,978 B1 | 2/2006 | Messano | |
| 7,025,166 B2 | 4/2006 | Thomas | |
| 7,025,408 B2 | 4/2006 | Jones et al. | |
| 7,069,702 B2 | 7/2006 | Ehrlich | |
| 7,134,820 B2 | 11/2006 | Ehrlich | |
| 7,182,396 B2 | 2/2007 | Taylor | |
| 7,219,952 B2 | 5/2007 | Taylor | |
| 7,264,305 B2 | 9/2007 | Kuriakose | |
| 7,353,960 B2 | 4/2008 | Seiter | |
| 7,407,216 B2 | 8/2008 | Taylor | |
| 7,434,520 B2 | 10/2008 | Zupancich et al. | |
| 7,451,995 B2 | 11/2008 | Bloodworth et al. | |
| 7,461,888 B2 | 12/2008 | Brown | |
| 7,517,005 B2 | 4/2009 | Kuriakose | |
| 7,575,264 B1 | 8/2009 | Solomon | |
| 7,578,534 B2 | 8/2009 | Wuerfel, III | |
| 7,578,541 B2 | 8/2009 | Layfield et al. | |
| 7,587,984 B2 | 9/2009 | Zupancich et al. | |
| 7,588,286 B2 | 9/2009 | Lewallen et al. | |
| 7,594,474 B2 | 9/2009 | Zupancich | |
| 7,608,313 B2 | 10/2009 | Solomon et al. | |
| 7,621,589 B1 | 11/2009 | Gerome | |
| 7,704,026 B2 | 4/2010 | Roush et al. | |
| 7,722,112 B2 | 5/2010 | Ehrlich | |
| 7,748,172 B2 | 7/2010 | Zupancich et al. | |
| 7,762,618 B2 | 7/2010 | Lewallen et al. | |
| 7,770,928 B2 | 8/2010 | Booher | |
| 7,790,076 B2 | 9/2010 | Seiter et al. | |
| 7,829,165 B2 | 11/2010 | Grandominico et al. | |
| 7,887,120 B2 | 2/2011 | Boivin et al. | |
| 7,901,537 B2 | 3/2011 | Jones et al. | |
| 7,905,072 B2 | 3/2011 | Verhaeghe | |
| 7,914,034 B2 | 3/2011 | Roush | |
| 7,931,328 B2 | 4/2011 | Lewallen et al. | |
| 8,016,322 B2 | 9/2011 | Keehan et al. | |
| 8,056,960 B2 | 11/2011 | Brown | |
| 8,186,747 B2 | 5/2012 | Bloodworth et al. | |
| 8,263,217 B2 | 9/2012 | Verhaeghe | |
| 8,342,588 B2 | 1/2013 | Skaradzinski | |
| 8,448,989 B2 | 5/2013 | Verhaeghe | |
| 8,474,171 B1 | 7/2013 | Simmons | |
| 8,696,048 B2 | 4/2014 | Griffin et al. | |
| 8,757,704 B2 | 6/2014 | Zhao et al. | |
| 8,814,255 B2 | 8/2014 | Yamaji et al. | |
| 8,876,193 B2 | 11/2014 | Kunkel et al. | |
| 8,950,144 B2 | 2/2015 | Padmanabhan | |
| 9,051,014 B2 | 6/2015 | Lookebill et al. | |
| 9,138,943 B2 | 9/2015 | Weinberg et al. | |
| 9,138,974 B2 | 9/2015 | Weinberg et al. | |
| 9,138,975 B2 | 9/2015 | Weinberg et al. | |
| 9,174,656 B2 | 11/2015 | Heitmeyer et al. | |
| 9,199,440 B2 | 12/2015 | Weinberg et al. | |
| 9,205,635 B2 | 12/2015 | Weinberg et al. | |
| 9,260,117 B2 | 2/2016 | Vande Sande | |
| 9,339,987 B2 | 5/2016 | Weinberg et al. | |
| 9,371,468 B2 | 6/2016 | Lewit | |
| 9,399,492 B2 * | 7/2016 | Booher | B62D 25/2054 |
| 9,409,607 B2 | 8/2016 | Osten | |
| 9,434,421 B1 | 9/2016 | Lu et al. | |
| 9,499,203 B1 | 11/2016 | Finley | |
| 9,566,769 B2 | 2/2017 | Weinberg et al. | |
| 9,604,677 B2 | 3/2017 | McKinney et al. | |
| 9,650,003 B2 | 5/2017 | Owens et al. | |
| 9,708,009 B2 | 7/2017 | Vance | |
| 9,738,050 B2 | 8/2017 | Lee et al. | |
| 9,744,753 B2 | 8/2017 | Sheffield et al. | |
| 9,815,501 B2 | 11/2017 | McCormack et al. | |
| 9,827,750 B2 | 11/2017 | Lookebill et al. | |
| 9,828,164 B2 | 11/2017 | Denson | |
| 9,878,744 B2 | 1/2018 | Lu et al. | |
| 9,884,660 B2 | 2/2018 | Fenton | |
| 9,884,661 B2 | 2/2018 | Fenton | |
| 9,889,637 B2 | 2/2018 | Weinberg et al. | |
| 2001/0011832 A1 | 8/2001 | Ehrlich et al. | |
| 2002/0033619 A1 | 3/2002 | Hurst et al. | |
| 2005/0194381 A1 | 9/2005 | Zupancich et al. | |
| 2005/0241253 A1 | 11/2005 | Song et al. | |
| 2006/0065152 A1 | 3/2006 | Heitmeyer et al. | |
| 2006/0108361 A1 | 5/2006 | Seiter | |
| 2006/0121244 A1 | 6/2006 | Godwin et al. | |
| 2006/0123725 A1 | 6/2006 | Godwin | |
| 2006/0144014 A1 | 7/2006 | Yoon et al. | |
| 2006/0158005 A1 | 7/2006 | Brown | |
| 2006/0179733 A1 | 8/2006 | Padmanabhan | |
| 2006/0201081 A1 | 9/2006 | Godwin | |

(56) References Cited

U.S. PATENT DOCUMENTS

| | | |
|---|---|---|
| 2006/0219129 A1 | 10/2006 | Jarvis |
| 2007/0119850 A1 | 5/2007 | Seiter |
| 2007/0132278 A1 | 6/2007 | Lester et al. |
| 2007/0160793 A1 | 7/2007 | Cageao et al. |
| 2007/0194602 A1 | 8/2007 | Ehrlich |
| 2007/0204550 A1* | 9/2007 | McPherson ............ B62D 21/20 52/633 |
| 2007/0216197 A1* | 9/2007 | Wuerfel, III ....... B62D 25/2054 296/184.1 |
| 2007/0250025 A1 | 10/2007 | Sams et al. |
| 2008/0290057 A1 | 11/2008 | Zupancich et al. |
| 2009/0126600 A1 | 5/2009 | Zupancich et al. |
| 2009/0278386 A1 | 11/2009 | Ehrlich |
| 2010/0101876 A1 | 4/2010 | Misencik |
| 2010/0109309 A1 | 5/2010 | Kootstra |
| 2011/0095574 A1 | 4/2011 | Brown |
| 2011/0204611 A1 | 8/2011 | Ziegler et al. |
| 2013/0207413 A1 | 8/2013 | Lookebill et al. |
| 2014/0054916 A1 | 2/2014 | Knudtson et al. |
| 2014/0199551 A1 | 7/2014 | Lewit |
| 2014/0262011 A1 | 9/2014 | Lewit et al. |
| 2014/0300134 A1 | 10/2014 | Gerst |
| 2015/0054311 A1 | 2/2015 | Marchesano et al. |
| 2015/0076861 A1 | 3/2015 | Padmanabhan |
| 2015/0137560 A1 | 5/2015 | Preisler et al. |
| 2015/0158532 A1 | 6/2015 | Ayuzawa et al. |
| 2015/0203160 A1 | 7/2015 | Peterson et al. |
| 2016/0016229 A1 | 1/2016 | Czinger et al. |
| 2016/0339829 A1 | 11/2016 | McCloud |
| 2017/0057561 A1 | 3/2017 | Fenton |
| 2017/0166263 A1 | 6/2017 | McKinney et al. |
| 2017/0210317 A1 | 7/2017 | Owens et al. |
| 2017/0240216 A1 | 8/2017 | Bauer et al. |
| 2017/0240217 A1 | 8/2017 | Storz et al. |
| 2017/0241134 A1 | 8/2017 | McCloud et al. |
| 2017/0247063 A1 | 8/2017 | Banerjee et al. |
| 2017/0282499 A1 | 10/2017 | Larocco |
| 2017/0334489 A1 | 11/2017 | Shin |
| 2018/0037151 A1 | 2/2018 | Bauer et al. |
| 2018/0244321 A1 | 8/2018 | McCloud |

FOREIGN PATENT DOCUMENTS

| | | | |
|---|---|---|---|
| CA | 2181750 | A1 | 1/1997 |
| CA | 2199584 | A1 | 9/1997 |
| CA | 2551863 | A1 | 3/1998 |
| CA | 2219312 | A1 | 4/1998 |
| CA | 2242467 | A1 | 7/1999 |
| CA | 2261384 | A1 | 8/1999 |
| CA | 2265405 | A1 | 1/2000 |
| CA | 2275848 | A1 | 12/2000 |
| CA | 2382578 | A1 | 3/2001 |
| CA | 2253308 | C | 7/2002 |
| CA | 2455957 | A1 | 5/2004 |
| CA | 2768878 | A1 | 3/2005 |
| CA | 2811134 | A1 | 4/2006 |
| CA | 2529762 | A1 | 6/2006 |
| CA | 2650992 | A1 | 11/2006 |
| CA | 2528558 | A1 | 5/2007 |
| CA | 2565510 | A1 | 8/2007 |
| CA | 2604282 | A1 | 3/2008 |
| CA | 2689745 | A1 | 7/2009 |
| CA | 2689746 | A1 | 7/2009 |
| CA | 2689747 | A1 | 7/2009 |
| CA | 2689748 | A1 | 7/2009 |
| CA | 2689749 | A1 | 7/2009 |
| CA | 2689751 | A1 | 7/2009 |
| CA | 2797778 | A1 | 7/2009 |
| CA | 2802907 | A1 | 7/2009 |
| CA | 2788047 | A1 | 8/2011 |
| CA | 2763094 | A1 | 7/2012 |
| CA | 2807710 | A1 | 8/2013 |
| CA | 2848174 | A1 | 10/2014 |
| CA | 2894059 | A1 | 12/2015 |
| CA | 2977131 | A1 | 9/2016 |
| CA | 2958805 | A1 | 8/2017 |
| CA | 2958838 | A1 | 8/2017 |
| CA | 2958839 | A1 | 8/2017 |
| DE | 2617169 | A1 | 11/1977 |
| EP | 2660119 | A1 | 11/2013 |
| JP | 06-293233 | A | 10/1994 |

OTHER PUBLICATIONS

CMS North America, Inc., "Transportation: Refrigerated Semi-trailers, Trailers & Vans," available online at http://www.cmsna.com/13_transportation_refrigerated_semi_trailers_trailers_vans.php on or before Jul. 2, 2014, 2 pages.

Composite Marine Control Surface, installed on USS Pioneer (MCM 9), May 1997, 13 pages.

Composite Twisted Rudder, TCC Meeting 2008, handout, 32 pages.

Eric Green Associates.com, "Composite Rudders Take Shape for U.S. Navy" available online at http://www.ericgreeneassociates.com/Images/Composite_Twisted_Rudder.pdf, accessed as early as Jul. 13, 2014, 7 pages.

Expedition Portal, "Truck Camper Construction Costs?," available online at http://www.expeditionportal.com/forum/threads/12486-Truck-Camper-Constrnction-Costs at least as early as Jun. 18, 2015, 5 pages.

Griffiths, Bob, "Rudder Gets New Twist with Composites," CompositesWorld, posted Aug. 1, 2006, 4 pages.

International Preliminary Report on Patentability issued by the IPEA/US, Commissioner for Patents, dated Dec. 15, 2017, for International Application No. PCT/US2016/050509; 21 pages.

International Preliminary Report on Patentability received for PCT Patent Application No. PCT/US2016/050509, dated Dec. 15, 2017, 20 pages.

International Search Report and Written Opinion issued by the ISA/US, Commissioner for Patents, dated Nov. 29, 2016, for International Application No. PCT/US2016/050509; 11 pages.

International Search Report and Written Opinion received for PCT Patent Application No. PCT/US2016/050509, dated Nov. 29, 2016, 11 pages.

International Trucking Shows, "True Composites Platform Highlight of International Trucking Show," Aug. 1992, 1 page.

Johnson Truck Bodies, Blizzard Series brochure, accessed as early as Aug. 1, 2014, 8 pages.

Kedward, Keith and Whitney, James, Delaware Composites Design Encyclopedia, "Design Studies," vol. 5, 1990, preview version available at https://books.google.com/books?id=9-KYOm81MWEC&printsec=frontcover#v=onepage&q&f=false, 17 pages.

Lightweight Structures B.V., "ColdFeather: lightweight composite isothermal trailer," available online at http://www.lightweight-structures.com/coldfeather-lightweight-composite-isothermal-trailer/index.html at least as early as Jun. 18, 2015, 6 pages.

Morey, Bruce, "Advanced Technologies Supplement: Processes Reduce Composite Costs," Advanced Manufacturing, posted Apr. 1, 2007, 7 pages.

NetCompositesNow.com, "Twisted Composites Rudders," available online at http://www.netcomposites.com/news/twisted-composites-rudders/3202 as early as Aug. 11, 2005, 3 pages.

North American Composites, Virtual Engineered Composites (VEC) Article, available online at http://www.nacomposites.com/delivering-performance/page.asp?issueid=7&page=cover, Fall 2006, 4 pages.

Reichard, Dr. Ronnal P., "Composites in Theme Parks: From the perspective of a contractor—trouble shooter-enthusiast!" presented at Florida Institute of Technology at least as early as 1999, 37 pages.

Scott Bader Group Companies, Crystic, "Composites Handbook", 100 pages.

Seaver, Mark and Trickey, Stephen, "Underwater Blast Loading of a Composite Twisted Rudder with FBGS," dated Apr. 14, 2008, 19th International Conference on Optical Fibre Sensors, 2 pages.

Trailer/Body Builders, "More Emphasis on Less Weight," available at http://trailer-bodybuilders.com/trailers/more-emphasis-less-weight, May 1, 2008, 5 pages.

(56) References Cited

OTHER PUBLICATIONS

Zweben, Carl, Handbook of Materials Selection, "Chapter 12: Composite Materials," 2002, preview version available at https://books.google.com/books?id=gWg-rchM700C&printsec=frontcover#v=onepage&q&f=false, 47 pages.

* cited by examiner

JOINING A RAIL MEMBER TO A COMPOSITE TRAILER STRUCTURE

CROSS-REFERENCE TO RELATED APPLICATIONS

This application is a divisional of U.S. patent application Ser. No. 15/738,341, filed Mar. 7, 2018, which is a U.S. National Stage Application of International Patent Application No. PCT/US2016/050509, filed Sep. 7, 2016; which claims priority to U.S. Provisional Patent Application Ser. No. 62/299,215, filed Feb. 24, 2016, the complete disclosures of which are hereby expressly incorporated by reference herein in their entirety.

FIELD OF THE DISCLOSURE

The present disclosure relates generally to joining a rail member to a composite cargo vehicle structure, such as a trailer structure and, more particularly, to joining a rail member to a composite floor assembly of a flat-bed or enclosed trailer.

BACKGROUND OF THE DISCLOSURE

A trailer or another cargo vehicle which supports and transports cargo may be a flat-bed or enclosed trailer. The flat-bed trailer includes an exposed floor assembly for supporting the cargo, the floor assembly being coupled to a perimeter frame assembly including one or more side rails, a front rail, and/or a rear rail. The enclosed trailer or cargo vehicle additionally includes side walls, a front wall, a rear door, and a roof that cooperate with the floor assembly to enclose the cargo. Any of the cargo vehicle components, for example the floor assembly, side walls, roof, and/or front wall, may be a composite structure formed from various metallic and/or polymeric materials.

Due to the configuration of composite structures, coupling another component of the cargo vehicle to the composite structure by forming holes in the composite structure for mechanical fasteners (e.g., bolts, rivets) may damage a portion of the composite structure. For example, the fibers in and around the holes of the composite structure may be damaged by the tool used to form the holes and/or by the fasteners placed in the holes. Therefore, a need exists to join various components of a cargo vehicle to a composite structure of the trailer (e.g., a composite floor assembly) while preserving the structural integrity of the composite structure.

SUMMARY OF THE DISCLOSURE

In one embodiment, a cargo vehicle configured to support cargo comprises a frame assembly including at least one rail member defining a portion of an outer perimeter of the trailer and a composite member adjacent to the frame assembly. The cargo vehicle further comprises an intermediate mounting member removably coupled to the at least one rail member and permanently coupled to the composite member.

In another embodiment, a method of joining a frame assembly of a cargo vehicle to a composite member of the cargo vehicle comprises providing at least one rail member of the frame assembly, abutting a portion of the composite member with a portion of the at least one rail member, and providing a mounting member. The method further comprises removably coupling the mounting member to the at least one rail member and permanently coupling the mounting member to the composite member.

In a further embodiment, a cargo vehicle comprises a frame assembly including at least one rail member defining a portion of an outer perimeter of the cargo vehicle. Additionally, the cargo vehicle comprises a composite member adjacent to the frame assembly and a mounting member. The mounting member includes first and second portions removably coupled to the at least one rail member and a third portion permanently coupled to the composite member.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1:
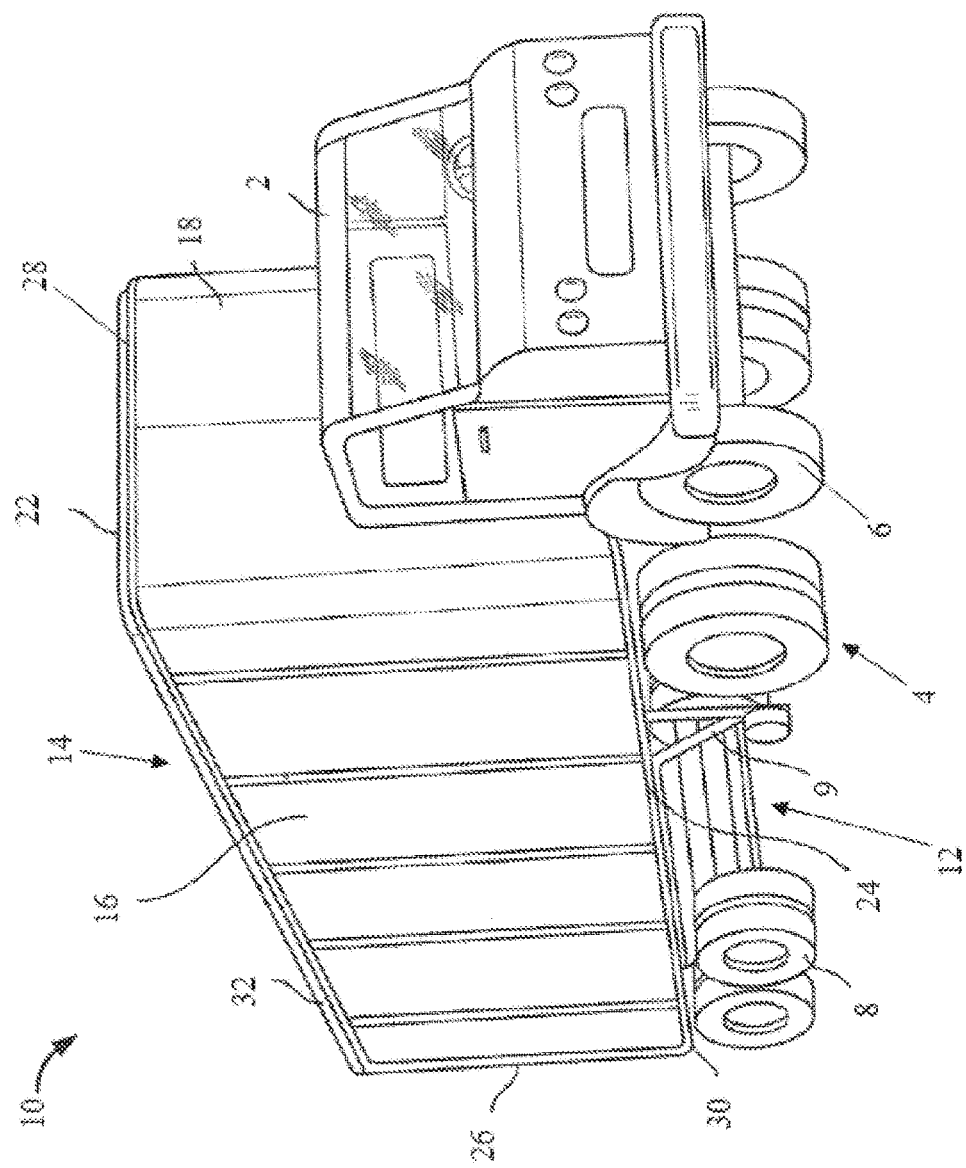
FIG. 1 is a right front perspective view of a vehicle including an enclosed trailer for supporting cargo.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, a vehicle 2 includes a plurality of ground-engaging members 4, for example front wheels 6 and rear wheels 8. Vehicle 2 further includes a trailer or rear cargo area 10 supported by a chassis 12 of vehicle 2 such that vehicle 2 may be characterized as a cargo vehicle. In one embodiment, chassis 12 may include a fifth wheel assembly (not shown). Additionally, landing gear 9 may be supported on chassis 12.

The illustrative trailer 10 of FIG. 1 includes an enclosed body 14 formed from a pair of side walls 16, a front or nose wall 18, at least one rear door (not shown), a roof 22, and a floor assembly 24. A horizontal panel or platform (not shown) of the floor assembly 24 is configured to support the cargo inside the enclosed body 14.

Various components of trailer 10 may be composite structures (i.e., structures constructed of composite materials). In one embodiment, side walls 16, front wall 18, the rear door, roof 22, and/or floor assembly 24 of trailer 10 are composite structures. In particular, the floor assembly 24 of trailer 10 may be a composite structure, in whole or in part.

Figure 3:
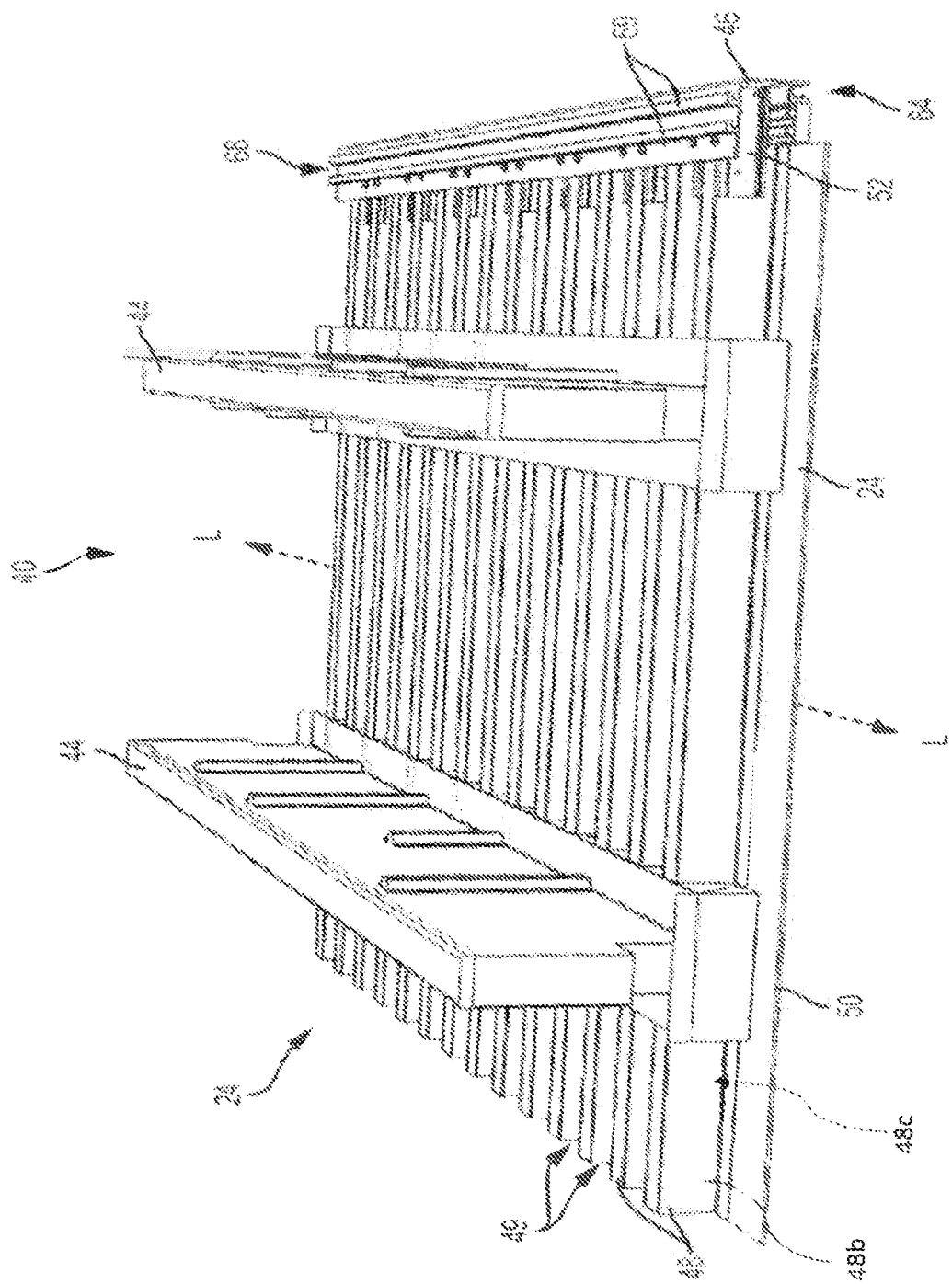
FIG. 3 is a rear perspective view of an underside of the flat-bed trailer of FIG. 2.

In general, composite materials are formed by combining two or more different constituents that remain separate and distinct in the final composite material. Exemplary composite materials may include fiber-reinforced plastics (FRP), for example carbon-fiber-reinforced plastics (CRP). Such materials may be formed from an extruded preform assembly of a woven or stitched fiberglass cloth, non-woven spun bond polymeric material, and a foam core 48c (FIG. 3). These preforms may be cut to size, combined in a mold resembling the final shape with other fiberglass and resin layers and wetted with at least one resin and optionally a catalyst to define a single structure during a curing process. In one embodiment, the spun bond polymeric material may be mechanically stitched to the fiberglass cloth and/or the foam before the preforms are wetted with resin. In one example, the spun bond material may be a polyester material, the foam may be a polyurethane material, and the resin may be a thermoset plastic resin matrix. An exemplary resin is the co-cure resin disclosed in U.S. Pat. No. 9,371,468, which is incorporated by reference in its entirety herein.

The individual preforms may be sized, shaped, and arranged in a manner that accommodates the strength requirements of the final structure. In areas of the final structure requiring less strength, the preforms may be relatively large in size, with the foam cores 48c (FIG. 3) spanning relatively large distances before reaching the surrounding fiberglass and polymeric skins 48b (FIG. 3). By contrast, in areas of the final structure requiring more strength, the preforms may be relatively small in size, with the foam cores 48c (FIG. 3) spanning relatively small distances before reaching the surrounding fiberglass and polymeric skins 48b (FIG. 3). For example, the preforms may be shaped as relatively wide panels in areas of the final structure requiring less strength and as relatively narrow support beams in areas of the final structure requiring more strength. Other exemplary techniques for strengthening such support beams include reinforcing the outer skins, such as by using uni-directional glass fibers or additional cloth in the outer skins, and/or reinforcing the inner cores, such as by using hard plastic blocks or higher density foam in the inner cores.

After the curing process, a coating may be applied to the inner and/or outer surfaces of the cured preforms. Additionally, metallic or non-metallic sheets or panels may be applied to the inner and/or outer surfaces of the cured preforms, either in place of the coating or with the coating. The metallic sheets or panels may be comprised of stainless steel, aluminum, and/or coated carbon steel, and the non-metallic sheets or panels may be comprised of carbon fiber composites, for example.

Exemplary composite structures include DuraPlate® panels available from Wabash National Corporation of Lafayette, Ind. and PRISMA® panels available from Compsys, Inc. of Melbourne, Fla. Such composite structures may be manufactured using technology disclosed in the following patents and published patent applications, each of which is incorporated by reference in its entirety herein: U.S. Pat. Nos. 5,429,066, 5,800,749, 5,664,518, 5,897,818, 6,013,213, 6,004,492, 5,908,591, 6,497,190, 6,911,252, 5,830,308, 6,755,998, 6,496,190, 6,911,252, 6,723,273, 6,869,561, 8,474,871, 6,206,669, 6,543,469, and 9,371,468 and U.S. Patent Application Publication No. 2014/0262011.

To define the ends of body 14, the rear door (not shown) may be operably coupled to side walls 16, roof 22, and floor assembly 24, through a rear frame member 26. Rear frame member 26 may be comprised of a metallic material. In one embodiment, rear frame member 26 is any non-composite metallic material, for example, aluminum. Additionally, front wall 18 is positioned opposite the rear door and may be joined with side walls 16, roof 22, and floor assembly 24 through a front frame member 28. Alternatively, front wall 18 may be integrally formed with side walls 16, roof 22, and floor assembly 24.

To define the sides of body 14, a lower end of side walls 16 may be joined with floor assembly 24 through a lower side frame member or rail 30, and an upper end of side walls 16 may be joined with roof 22 through an upper side frame member or rail 32. In one embodiment, side walls 16 extend continuously between front wall 18 and the rear door. Alternatively, side walls 16 may be comprised of a plurality of panels joined together along the length between front wall 18 and the rear door. Lower side rail 30 and/or upper side rail 32 may be comprised of an extrudable metallic material, for example, aluminum. Alternatively, side walls 16 may be integrally formed with floor assembly 24 and roof 22.

Figure 2:
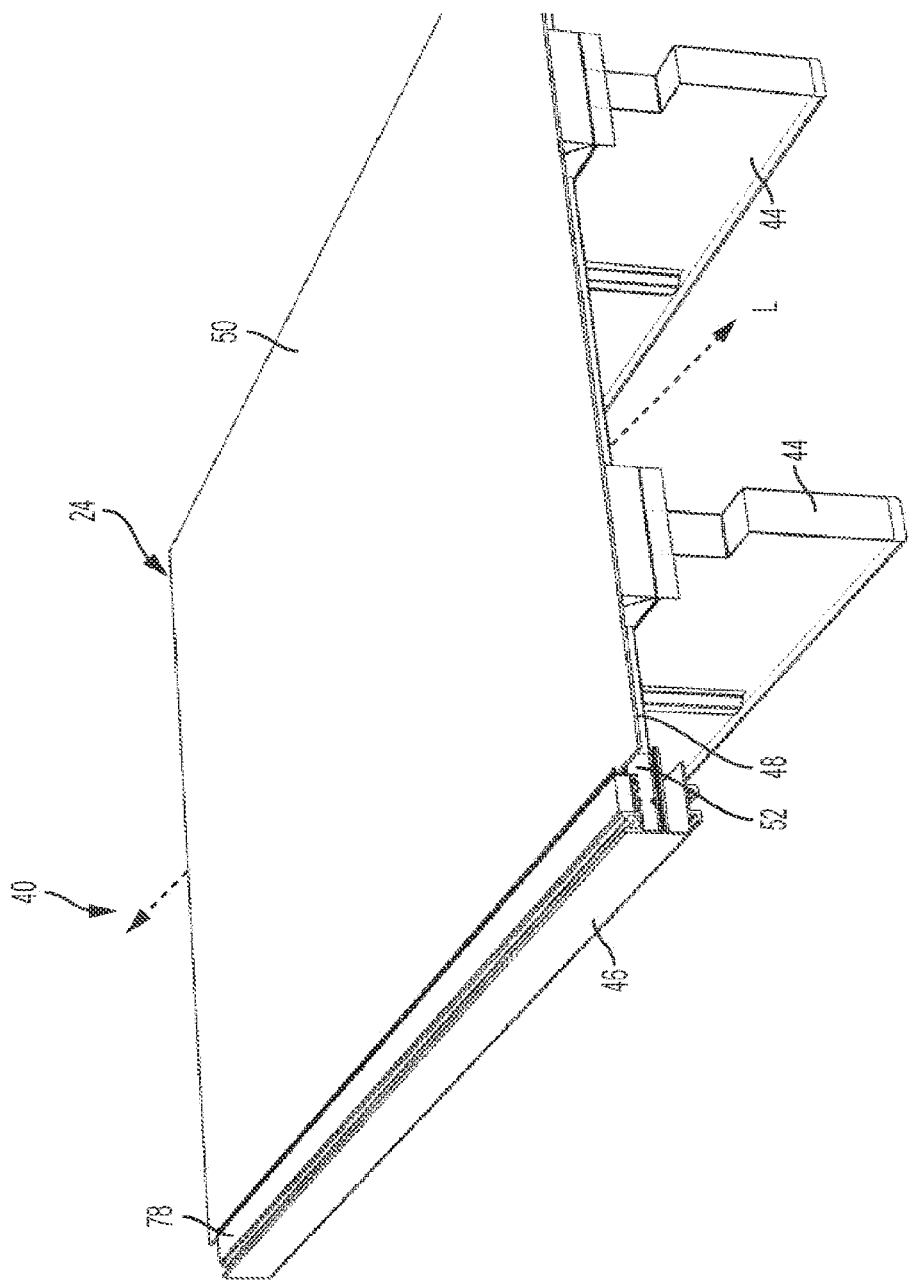
FIG. 2 is a left rear perspective view of a flat-bed trailer for supporting cargo.

In a further embodiment of FIG. 2, the vehicle includes a flat-bed trailer 40. Unlike the enclosed trailer 10 of FIG. 1, the flat-bed trailer 40 of FIG. 2 lacks side walls 16, front wall 18, roof 22, and a rear door around floor assembly 24. Instead, floor assembly 24 of the flat-bed trailer 40 includes an exposed panel or platform 50 for supporting cargo thereon.

Referring next to FIG. 3, floor assembly 24 includes longitudinal main support beams 44 that extend along a longitudinal axis L and a plurality of lateral support beams or cross members 48 that extend perpendicular to longitudinal axis L and main beams 44. Adjacent cross members 48 are separated by a recessed portion 49. Main beams 44 and cross members 48 are located beneath platform 50 to support platform 50 of floor assembly 24 and any cargo thereon. The individual components of floor assembly 24 may be assembled together through welding, bonding (e.g., adhesive), molding, or with mechanical fasteners (e.g., bolts, rivets). The entire floor assembly 24, including main beams 44, cross members 48, and platform 50, or portions thereof may be composite structures (i.e., structures constructed of composite materials), as disclosed herein. As such, floor assembly 24 may be referred to herein as a composite floor assembly 24. However, portions of composite floor assembly 24 may be comprised of non-composite (e.g., metallic) materials.

The composite construction of floor assembly 24 may present certain advantages. First, because the composite structures may lack internal metal components, the composite floor assembly 24 may have a reduced heat loss coefficient (Ua) and improved thermal efficiency. Also, the composite floor assembly 24 may operate to minimize outgassing of blowing agents, minimize air loss, and minimize water intrusion. Additionally, the composite floor assembly 24 may be lighter in weight than a typical metallic cargo body, which may improve fuel efficiency. Further, the composite floor assembly 24 may have fewer metallic structures than a typical cargo body, which may make the cargo body 14 less susceptible to corrosion. Also, the composite floor assembly 24 may include fewer parts than a typical metallic cargo body, which may simplify construction, reduce inventory, and reduce variation in manufacturing. Further, the composite floor assembly 24 may be suitable for use with sensitive cargo, including foodstuffs, because the composite materials may be inert to avoid reacting with the cargo and other materials and because the composite materials may be easy to clean and maintain to ensure proper hygiene. As a result, the composite floor assembly 24 may qualify as "food grade" equipment.

Referring still to FIG. 3, flat-bed trailer 40 also includes a perimeter frame assembly that defines at least a portion of an outer perimeter of flat-bed trailer 40. In the illustrated embodiment of FIG. 3, the perimeter frame assembly includes one or more side rails 46 positioned laterally outward from main beams 44 to define at least a portion of an outer perimeter of the composite floor assembly 24. The perimeter frame assembly may also include a front rail (not shown) positioned at a longitudinally-forward end of main beams 44 and/or a rear rail (not shown) positioned at a longitudinally-rearward end of main beams 44. In this embodiment, side rails 46 may be coupled to the front rail and/or the rear rail to cooperatively define the perimeter of the composite floor assembly 24. The following discussion relates specifically to the side rail 46 of flat-bed trailer 40 (FIG. 3), but the teachings are also applicable to other perimeter rails or frame members, including frame members 26, 28, 30, 32 of the enclosed trailer 10 (FIG. 1).

Figure 4:
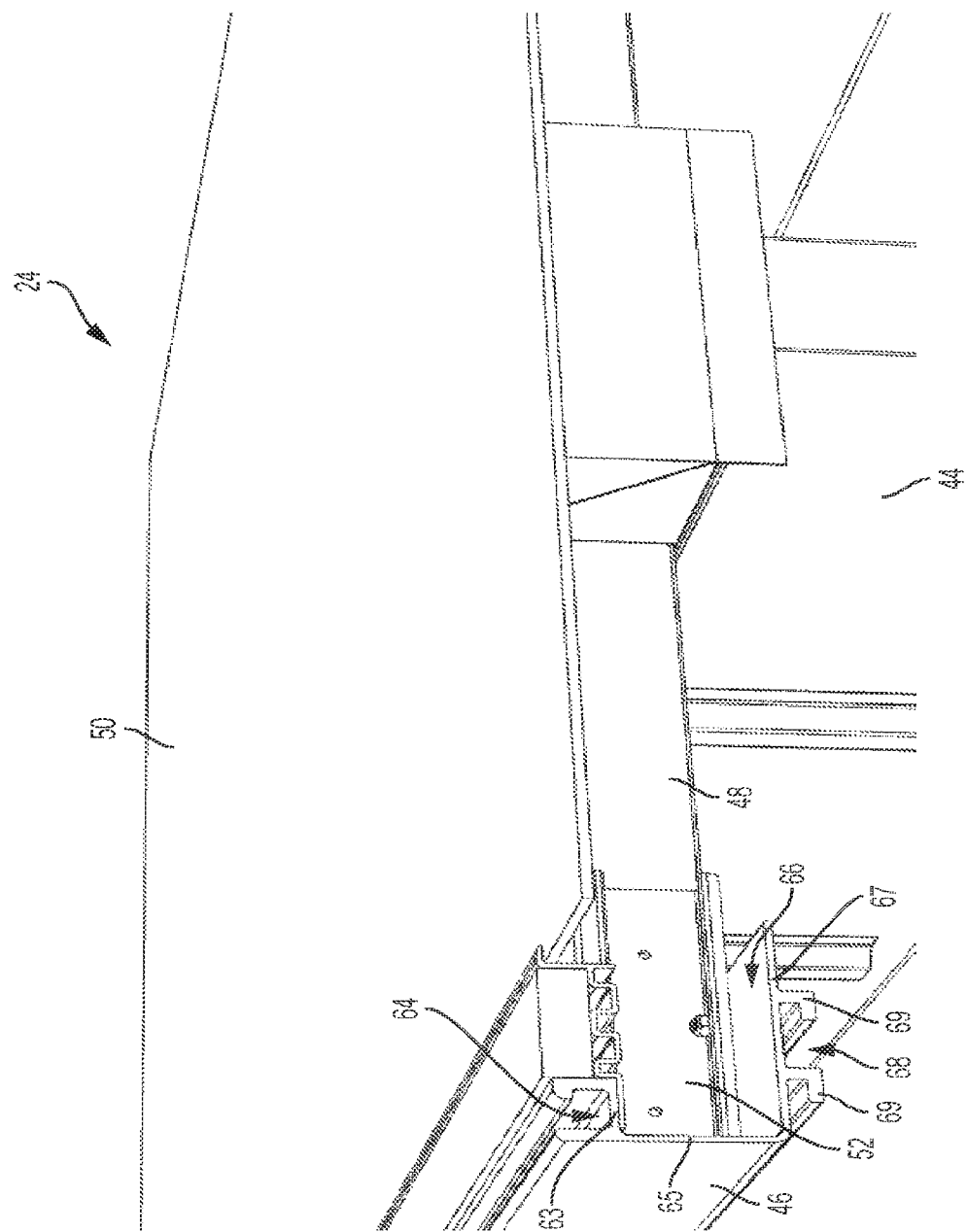
FIG. 4 is a left rear perspective view of a first embodiment mounting member coupling a composite floor assembly to a side rail of the flat-bed trailer of FIG. 2.
Figure 5:
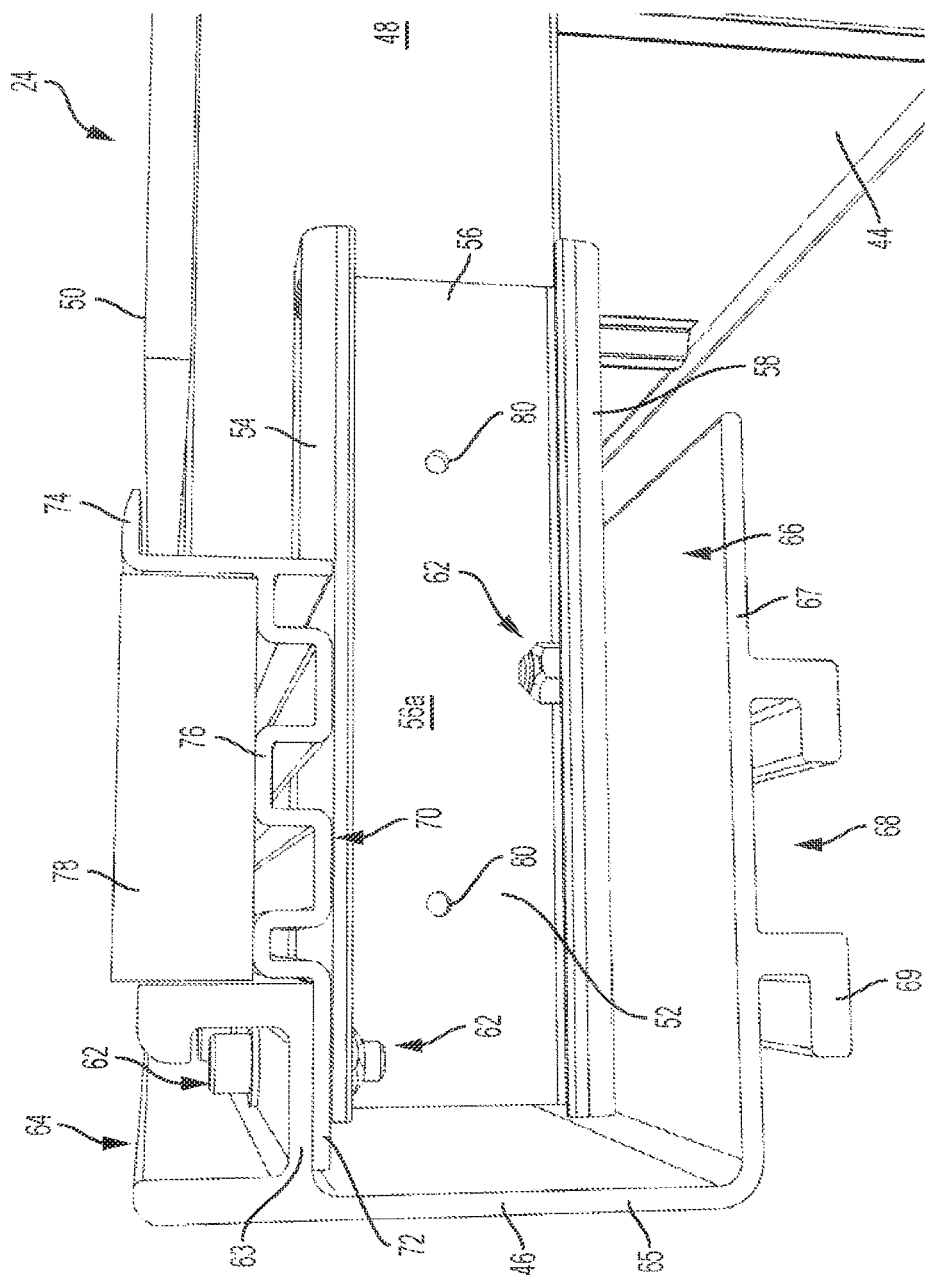
FIG. 5 is a rear perspective view of the mounting member, the composite floor assembly, and the side rail of FIG. 4.
Figure 6:
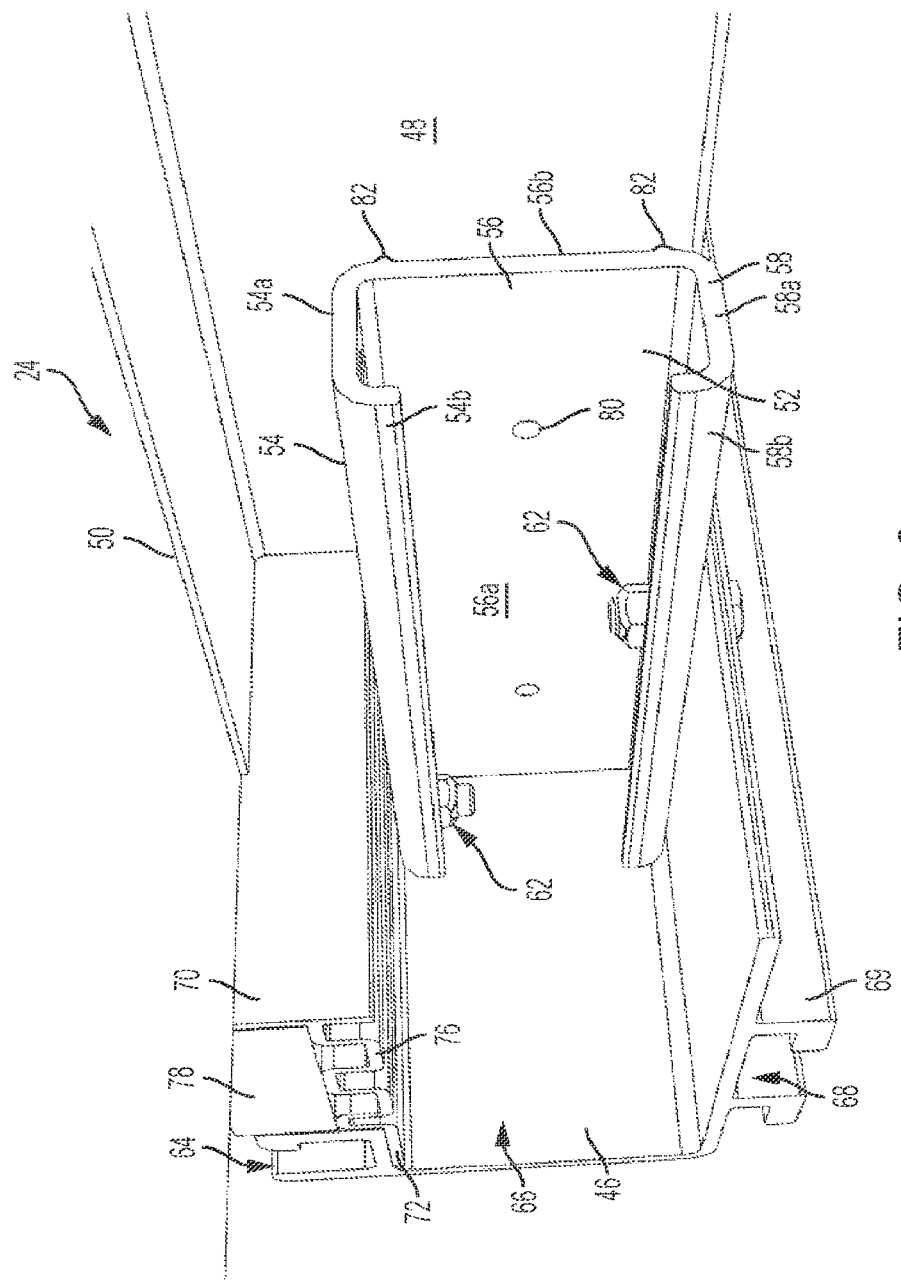
FIG. 6 is a right rear perspective view of the mounting member, the composite floor assembly, and the side rail of FIG. 4.

Referring next to FIGS. 4-6, each side rail 46 may be a metallic extrusion (e.g., aluminum extrusion) which includes an upper portion 63, a vertical wall 65, and a lower portion 67. An upper channel 64 is formed in upper portion 63, an intermediate channel 66 is formed between upper and lower portions 63, 67, and a lower channel 68 is formed in lower portion 67. In one embodiment, upper and lower channels 64, 68 of side rails 46 are configured to receive various retaining and/or coupling members for coupling components to side rails 46. For example, to secure cargo on flat-bed trailer 40, a sliding J-hook (not shown) may be positioned within upper channel 64 of side rail 46 and a winch (not shown) may be positioned within lower channel 68 of side rail 64 and retained therein by legs 69 which define a winch track.

As shown in FIG. 5, each side rail 46 also includes a support member 70 positioned adjacent upper portion 63. Support member 70 includes an outer portion 72 which extends into intermediate channel 66 to support upper portion 63 of side rail 46 beneath upper channel 64. Support member 70 also includes an inner portion 74 which at least partially overhangs platform 50 of composite floor assembly 24. A ledge 76 of support member 70 extends between outer portion 72 and inner portion 74 and is configured to receive a nail strip 78 or other portion of flat-bed trailer 40. Straps, bands, bungees, cords, or other retaining and/or coupling members may be coupled (e.g., nailed, stapled) to nail strip 78 to secure cargo on flat-bed trailer 40.

As discussed above, floor assembly 24, and specifically cross members 48 of floor assembly 24, may be composite structures. Due to the configuration of composite structures, the composite cross members 48 may not be directly coupled to side rails 46 with mechanical fasteners, because forming holes in the composite cross members 48 for direct insertion of mechanical fasteners (e.g., bolts, rivets) may damage the fibers of the composite material forming cross members 48.

To preserve the structural integrity of composite floor assembly 24, cross members 48 of composite floor assembly 24 may be coupled to side rails 46 through intermediate mounting members, as shown in FIGS. 4-19. Once again, although the following discussion relates specifically to cross members 48 and side rails 46 of flat-bed trailer 40 (FIG. 3), the teachings are also applicable to other composite members in addition to cross members 48 and other perimeter rails or frame members in addition to side rails 46.

The intermediate mounting members disclosed herein are permanently coupled to cross members 48 of composite floor assembly 24 and are removably coupled to side rails 46, which enables composite floor assembly 24 to be removably coupled to side rail 46 through the mounting member. As used herein, components that are "removably coupled" together are capable of being repeatedly un-coupled without damage or destruction and then re-coupled together. In certain exemplary embodiments, components may be "removably coupled" together through fasteners (e.g., bolts, rivets). By contrast, components that are "permanently coupled" together require damage or destruction to the components themselves or the coupling mechanism in order to be un-coupled. In certain exemplary embodiments, components may be "permanently coupled" together through bonding (e.g., adhering) and/or molding, for example. The strength of the permanent coupling mechanism (e.g., adhesive) may exceed the strength of composite floor assembly 24 itself, so composite floor assembly 24 may delaminate or otherwise fail before the adhesive fails.

Any of the mounting members disclosed herein are not limited to the configurations shown and may be formed in different configurations and/or combined with any of the other mounting members such that floor assembly 24 may be coupled to side rails 46 with any combination or configuration of the mounting members disclosed herein. Additionally, the mounting members disclosed herein may be comprised of a metallic or polymeric material, for example aluminum, titanium, or steel. In one embodiment, the mounting members are comprised of an extruded metallic or polymeric material which is dissimilar from the materials used to construct floor assembly 24. The mounting members may have a thickness, t, of approximately 0.1-0.5 inches, more particularly, approximately 0.2 inches (FIG. 9).

Figure 7:
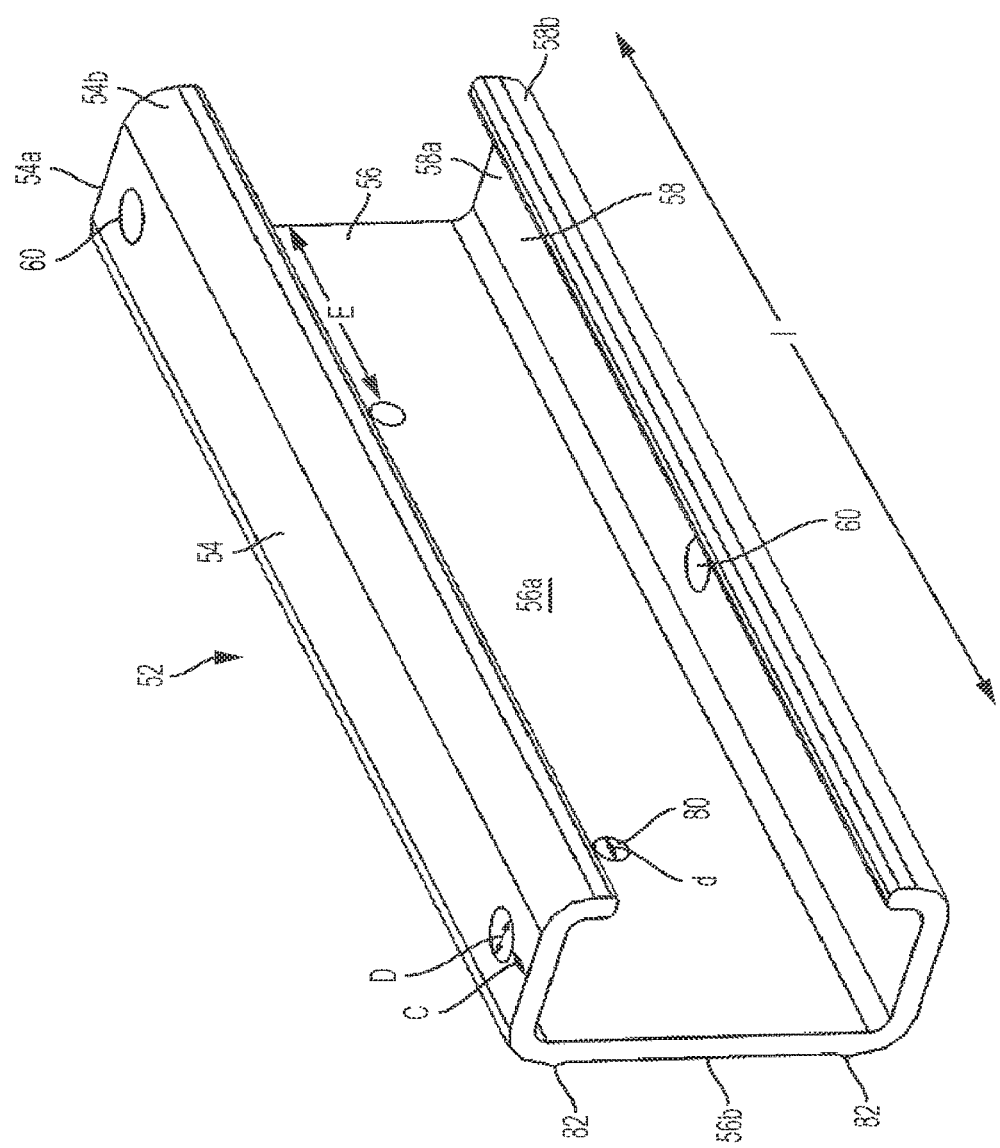
FIG. 7 is a perspective view of a first side of the mounting member of FIG. 4.
Figure 8:
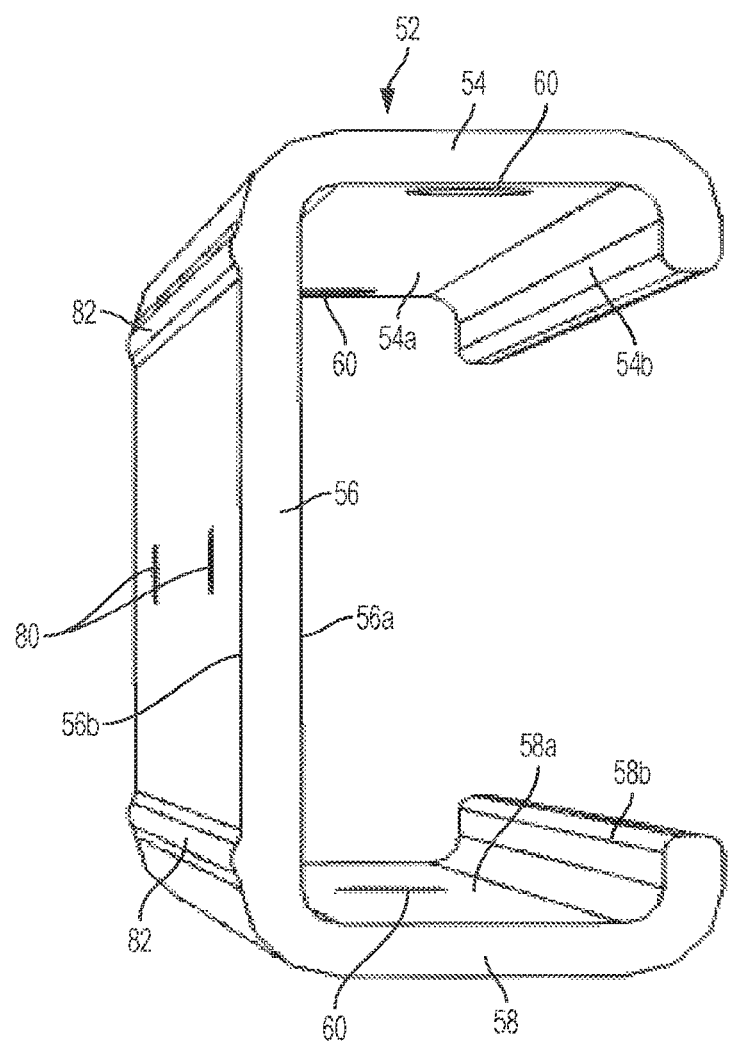
FIG. 8 is a perspective view of a second side of the mounting member of FIG. 4.
Figure 9:
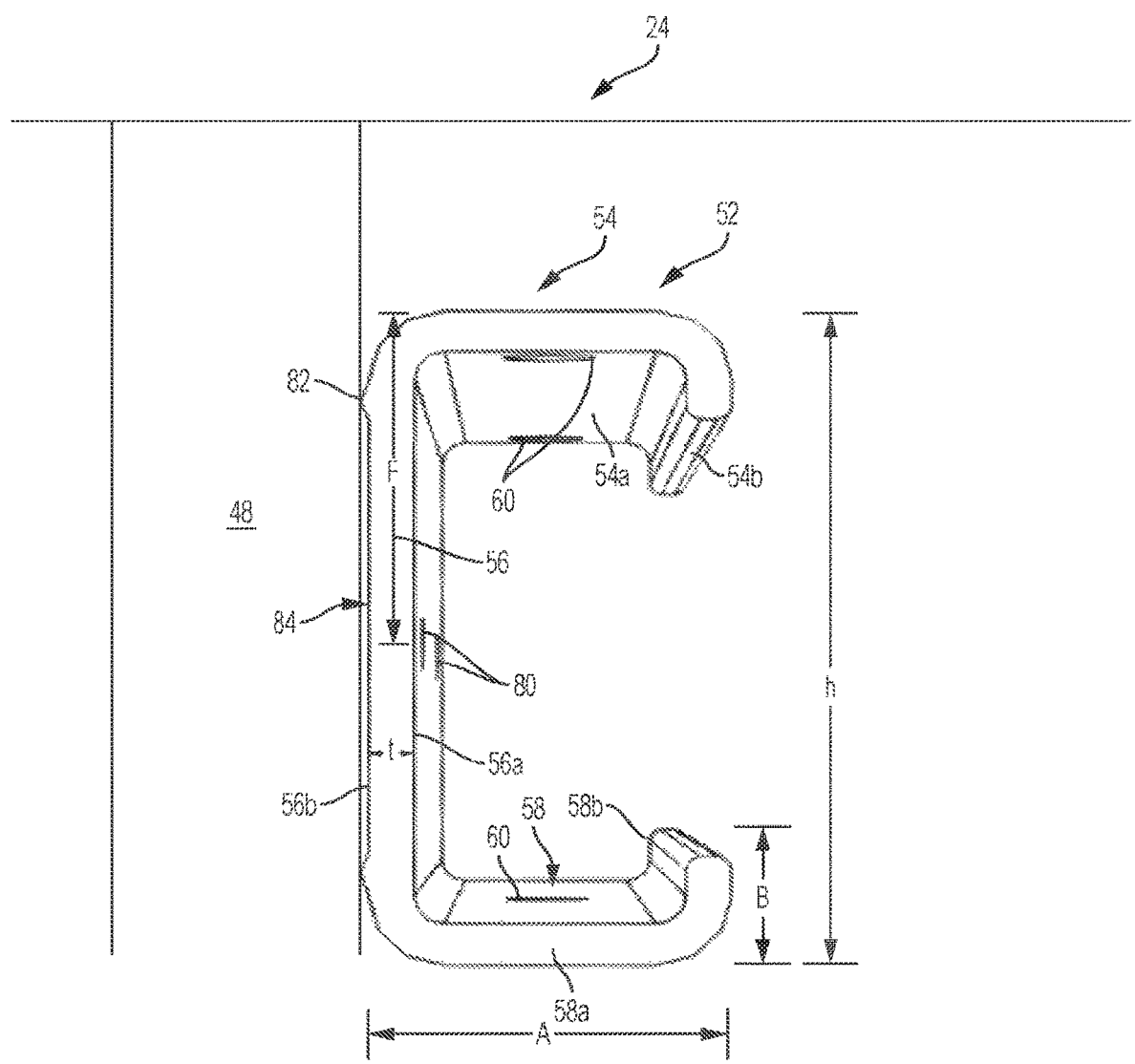
FIG. 9 is an end view of the mounting member coupled to a portion of the composite floor assembly of FIG. 4.

Illustratively, FIGS. 5-9 disclose a first embodiment of a mounting member 52. Mounting member 52 includes an upper portion 54, a vertical wall 56, and a lower portion 58. Illustratively, mounting member 52 defines a "C" in cross-section. More particularly, upper and lower portions 54, 58 extend generally perpendicularly from the vertical wall 56 and curve toward each other in a vertical direction. For example, as shown in FIGS. 6-9, upper portion 54 includes a linear section 54a extending generally perpendicularly and horizontally from the vertical wall 56 and a rounded section 54b extending vertically downward from linear section 54a. Lower portion 58 also includes a linear section 58a extending generally perpendicularly from the vertical wall 56 and a rounded section 58b extending vertically upward from linear section 58a. In one embodiment, mounting member 52 has a height, h, of approximately 1.0-5.0 inches and, more particularly, approximately 3.0 inches (FIG. 9), and has a length, l, of approximately 5.0-12.0 inches and, more particularly, approximately 8.6 inches (FIG. 7). Additionally, linear sections 54a, 58a may extend outwardly from the vertical wall 56 by a distance, A, which is approximately 1.0-2.0 inches and, more particularly, approximately 1.3 inches (FIG. 9). Also, illustrative rounded sections 54b, 58b may extend vertically from linear sections 54a, 58a by a distance, B, which is approximately 0.1-1.0 inches and, more particularly, approximately 0.5 inches (FIG. 9).

Linear sections 54a, 58a may include at least one opening 60 for receiving a fastener 62. Illustratively, linear section 54a includes two openings 60 and linear section 58a includes one opening 60. Openings 60 may have a diameter, D, of approximately 0.2-0.6 inches and, more particularly, approximately 0.4 inches (FIG. 7). In one embodiment, openings 60 in linear section 54a are positioned approximately 0.2-0.8 inches from the outer ends of linear section 54a and, more particularly, approximately 0.5 inches, as shown by the distance, C (FIG. 7). Additionally, opening 60 in linear section 58a may be positioned in the approximately center of linear section 58a.

Fastener 62 may include a bolt, rivet, screw, another mechanical fastener, or any combination thereof. In this way, linear sections 54a, 58a of mounting member 52 are removably coupled to side rails 46 with fasteners 62. More particularly, and as shown in FIGS. 5 and 6, mounting member 52 is positioned within intermediate channel 66 of side rail 46 and linear section 54a of upper portion 54 abuts support member 70. One of openings 60 of upper portion 54 of mounting member 52 aligns with corresponding openings (not shown) in support member 70 and upper portion 63 of side rail 46 such that the fastener 62 extends between upper channel 64 and intermediate channel 66 of side rail 46, and opening 60 of lower portion 58 of mourning member 52 aligns with an opening (not shown) in lower portion 67 of side rail 46 such that the fastener 62 extends between intermediate channel 66 and lower channel 68 of side rail 46. In this manner, fasteners 62 removably couple side rail 46 to composite floor assembly 24 through mounting member 52. As such, side rail 46 may be easily removed from composite floor assembly 24 for repairs or replacement by removing fasteners 62 from side rails 46 and mounting member 52. Alternatively, upper and lower portions 54, 58 may be welded to side rail 46. Additionally, because fasteners 62 do not directly couple side rail 46 to composite floor assembly 24, fasteners 62 and their corresponding openings 60 do not damage any of the fibers or other materials of composite floor assembly 24 and the structure integrity of composite floor assembly 24 is maintained.

As shown in FIGS. 5-9, wall 56 of mounting member 52 includes at least one opening 80 extending from an inner surface 56a to an outer surface 56b of wall 56. In one embodiment, openings 80 have a diameter, d, of approximately 0.1-1.5 inches and, more particularly, approximately 0.25 inches (FIG. 7). Openings 80 may be positioned approximately 1.0-3.0 inches from the outer ends of mounting member 52 and, more particularly, approximately 2.0 inches, as shown by the distance, E, in FIG. 7. Additionally, openings 80 may be positioned approximately 0.5-2.0 inches vertically below upper portion 54 and, more particularly, approximately 1.5 inches, as shown by a distance, F, in FIG. 9.

Wall 56 also includes a plurality of protrusions 82 extending outwardly from outer surface 56b. As shown in FIG. 9, protrusions 82 abut an outer surface of cross members 48 of composite floor assembly 24 such that outer surface 56b of wall 56 is spaced apart from cross members 48 by a gap 84. Gap 84 is configured to receive a bonding agent, such as adhesive, for bonding mounting member 52 to cross members 48 of composite floor assembly 24. More particularly, opening 80 defines an adhesive port and adhesive (not shown) is injected or otherwise supplied to gap 84 through openings 80 and occupies gap 84 between the outer surface of cross members 48 and outer surface 56b of wall 56 of mounting member 52. In one embodiment, the outer surface of cross members 48 and/or outer surface 56b of wall 56 may be roughened, scuffed, or otherwise texturized to receive the adhesive, at least in the areas bordering gap 84. In this way, mounting member 52 is bonded to cross members 48 of composite floor assembly 24. As such, no fasteners or other coupling devices extend into the composite material of composite floor assembly 24 and, therefore, the composite material is not damaged by any mechanical fasteners or their corresponding openings. Therefore, through the combination of permanently coupling mounting member 52 to composite floor assembly 24 with adhesive and removably coupling side rails 46 to mounting members 52 with fasteners 62, composite floor assembly 24 is not damaged by the assembly of side rails 46 to composite floor assembly 24 and side rails 46 are easily removed from composite floor assembly 24 when needed.

The adhesive supplied to gap 84 for bonding mounting member 52 to cross members 48 of composite floor assembly 24 may be a structural adhesive. Structural adhesives may be used for load-bearing applications and, therefore, may be epoxies, acrylics, polyurethanes, cyanoacrylates, anaerobics, phenolics, and/or vinyl acetates with a lap shear strength greater than 1 MPa. Structural adhesives are typically applied to bonding surfaces at a temperature below the glass-transition temperature of the adhesive and subsequently cured over time and/or with heat.

Figure 10:
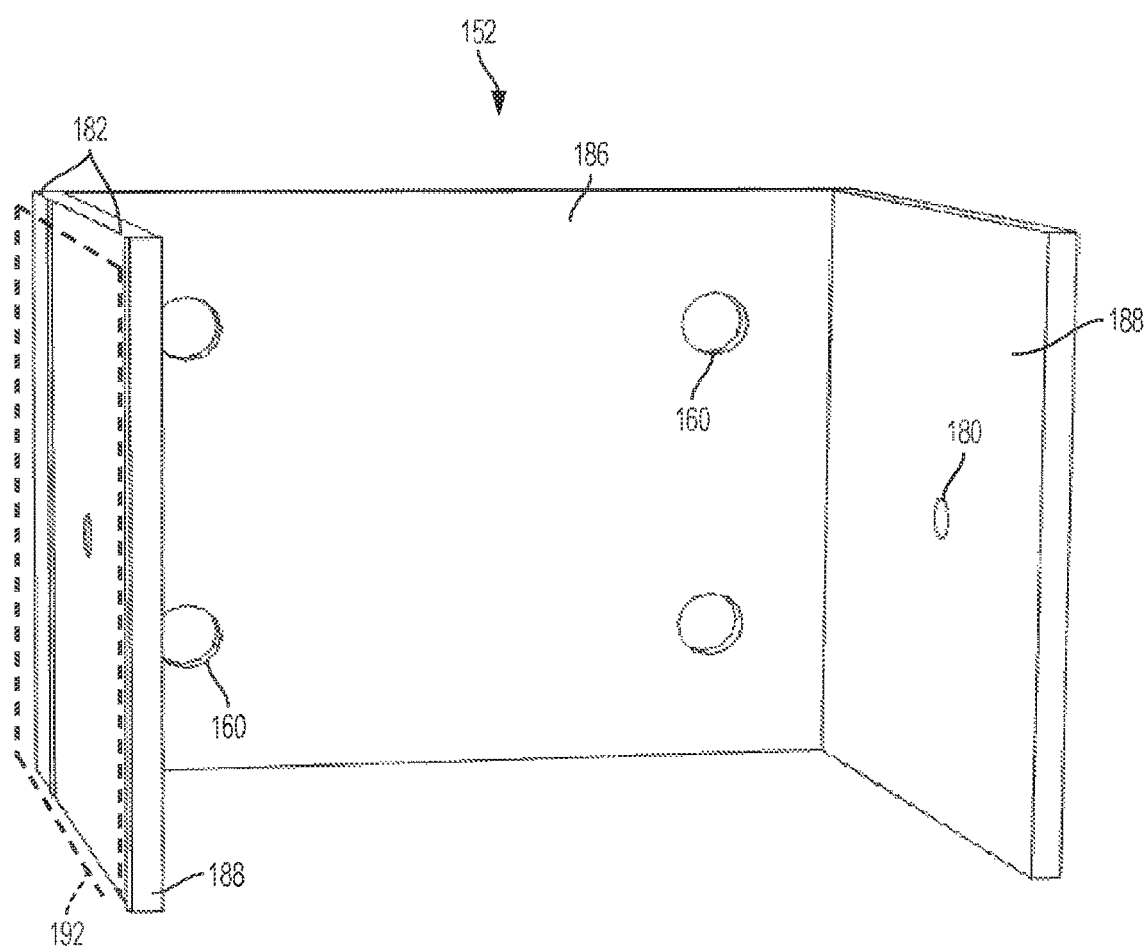
FIG. 10 is a perspective view of an alternative embodiment mounting member of the present application.
Figure 11:
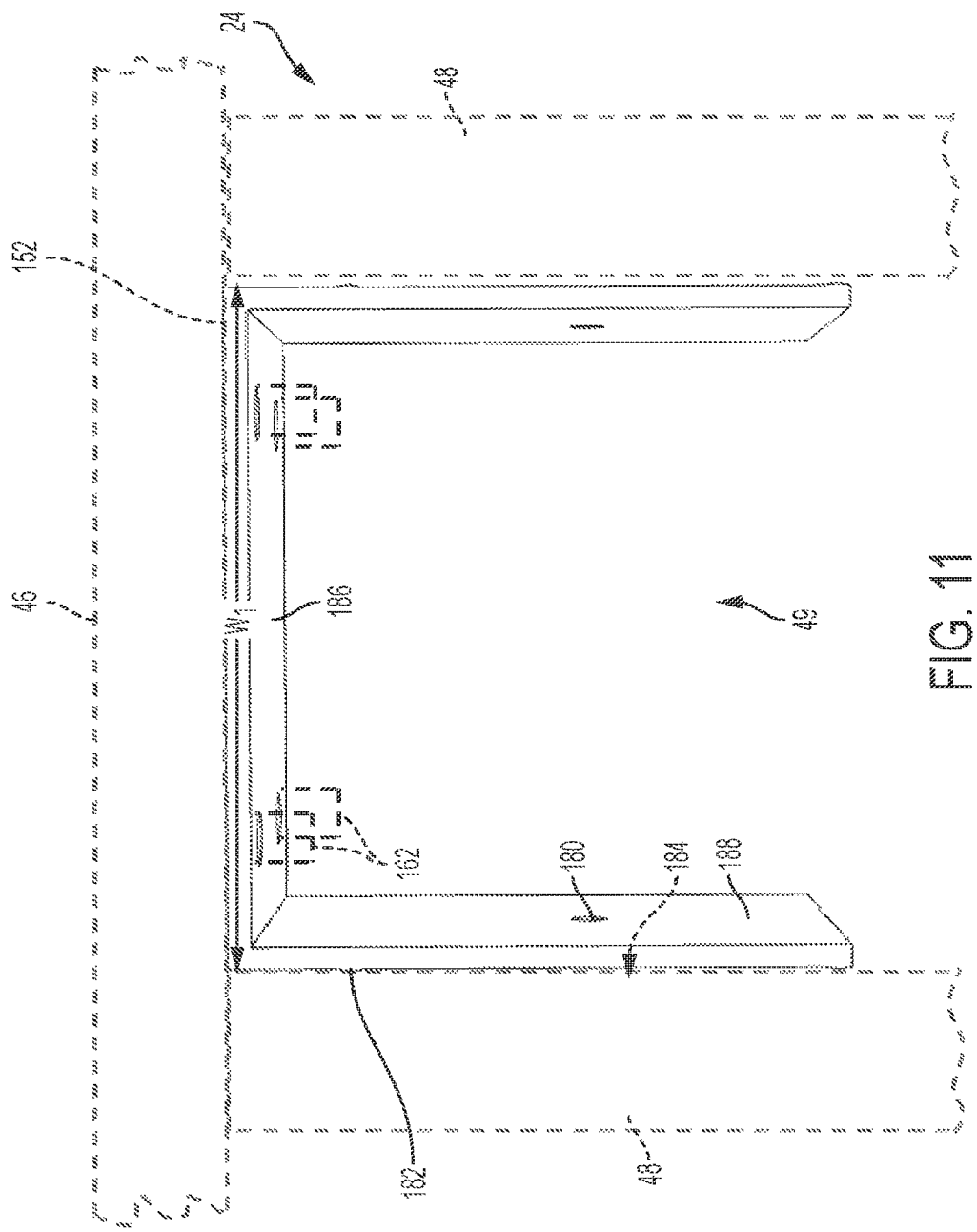
FIG. 11 is a bottom view of the alternative embodiment mounting member of FIG. 10 coupled to a portion of the composite floor assembly and side rail of FIG. 4.

Referring next to FIGS. 10 and 11, an alternative embodiment of mounting member 52 (FIG. 7) is shown as mounting member 152. Mounting member 152 is configured to be positioned within recessed portions 49 of composite floor assembly 24. Mounting member 152 includes an outer plate 186 configured to couple with side rail 46 and two legs 188 coupled to outer plate 186 and configured to bond with cross members 48 of composite floor assembly 24. In one embodiment, outer plate 186 has a width, $W_1$, which is approximately equal to the width of recessed portion 49. Outer plate 186 includes openings 160 for receiving fasteners 162. Openings 160 may have a diameter similar to diameter, D, for openings 60 (FIG. 7). As such, fasteners 162 removably couple side rail 46 to mounting member 152. Alternatively, outer plate 186 may be welded or otherwise coupled to side rail 46.

Legs 188 of mounting member 152 are angled relative to outer plate 186 and, as shown in FIG. 11, may extend generally perpendicularly from outer plate 186. Alternatively, lens 188 may be angled by more or less than 90 degrees from outer plate 186 such a width between legs 188 is greater than width, $W_1$, of outer plate 186 and, therefore, greater than a width of recessed portion 49. In this way, mounting member 152 may be frictionally retained between adjacent cross members 48.

Referring still to FIGS. 10 and 11, legs 188 also include openings 180 and a plurality of protrusions 182. As such, when mounting member 152 is positioned within recessed portion 49, protrusions 182 abut cross members 48 of composite floor assembly 24 to define a gap 184 between legs 188 and cross members 48. Legs 188 are bonded to cross members 48 with adhesive (not shown) which is supplied to gap 184 through openings 180. Openings 180 may have a diameter similar to diameter, d, of openings 80 (FIG. 7). As such, legs 188 are bonded to cross members 48 with the adhesive which may be a structural adhesive, as disclosed herein. Therefore, through the combination of permanently coupling mounting member 152 to composite floor assembly 24 with adhesive and removably coupling side rails 46 to mounting members 152 with fasteners 162, composite floor assembly 24 is not damaged by the assembly of side rails 46 to cross members 48 and side rails 46 are easily removed from composite floor assembly 24 when needed.

As shown in FIG. 10, in one embodiment, mounting member 152 may include at least one shim 192 that may be bonded to legs 188 with adhesive supplied to gap 184 through opening 180. Shim 192 may be comprised of a polymeric composite and/or laminate material. The bonded combination of shim 192 and mounting member 152 may be a sub-assembly that can be positioned within the mold forming composite floor assembly 24 to permanently couple the sub-assembly of shim 192 and mounting member 152 with composite floor assembly 24 during the molding process for composite floor assembly 24. For example, prior to formation of composite floor assembly 24, shim 192 may be bonded to legs 188 of mounting member 152. After the adhesive within gap 184 cures and is dry, the sub-assembly of shim 192 and mounting member 152 may be positioned within the mold for composite floor assembly 24 in a position in which shims 192 abut the composite materials comprising cross members 48 (e.g., foam, fiberglass cloth non-woven spun bond polymeric material, and any other materials forming composite floor assembly 24). Resin may then be applied to the mold to wet the materials within the mold and integrally and permanently couple shims 192 to the materials comprising cross members 48. The resin is then cured and composite floor assembly 24 may be removed from the mold. In this way, because shim 192 is comprised of a polymeric laminate and/or composite material that can be molded with the materials of composite floor assembly 24, mounting member 152 may be integrally formed with composite floor assembly 24 through shims 192 during the molding process. Mounting member 152 may then be removably coupled to side rail 46 with fasteners 162.

Figure 12:
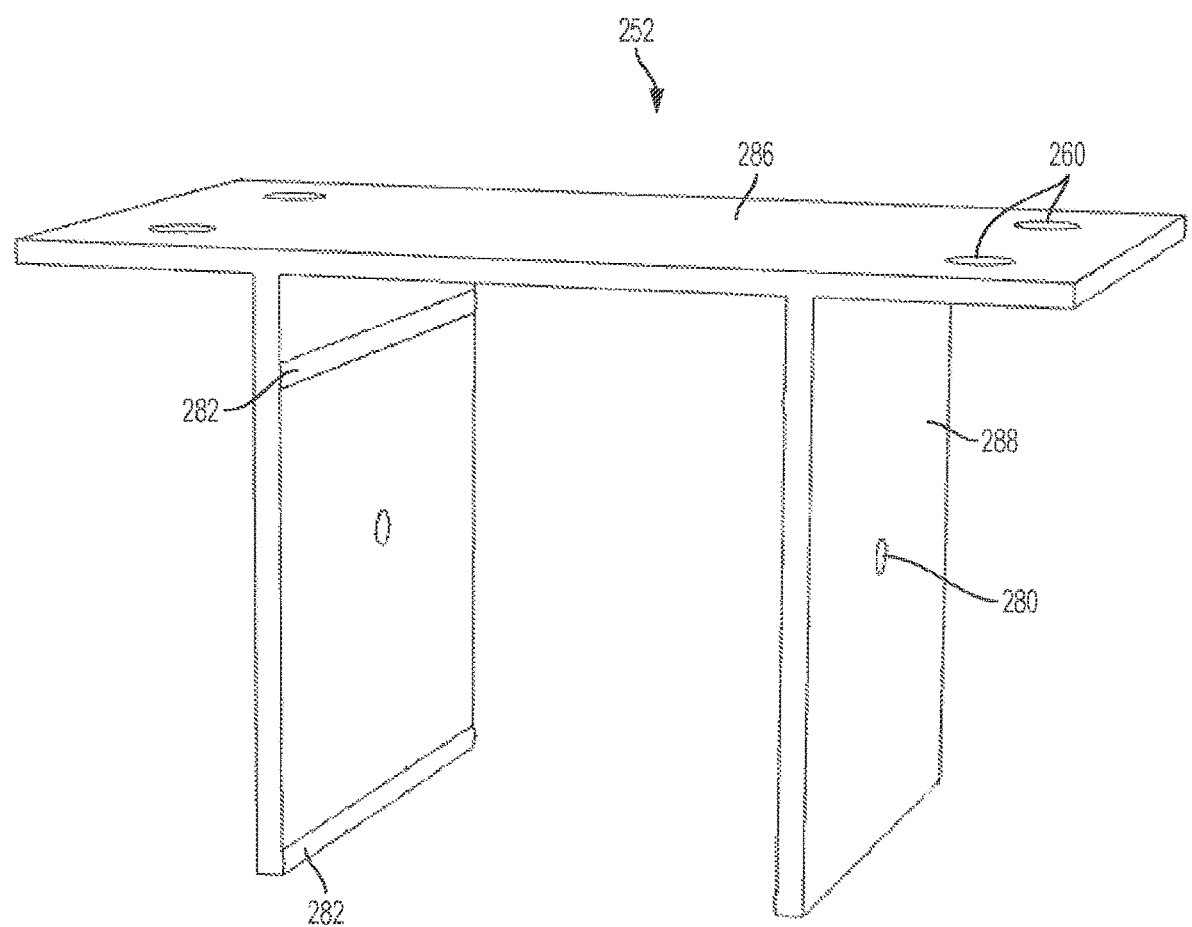
FIG. 12 is a perspective view of another alternative embodiment mounting member of the present application.
Figure 13:
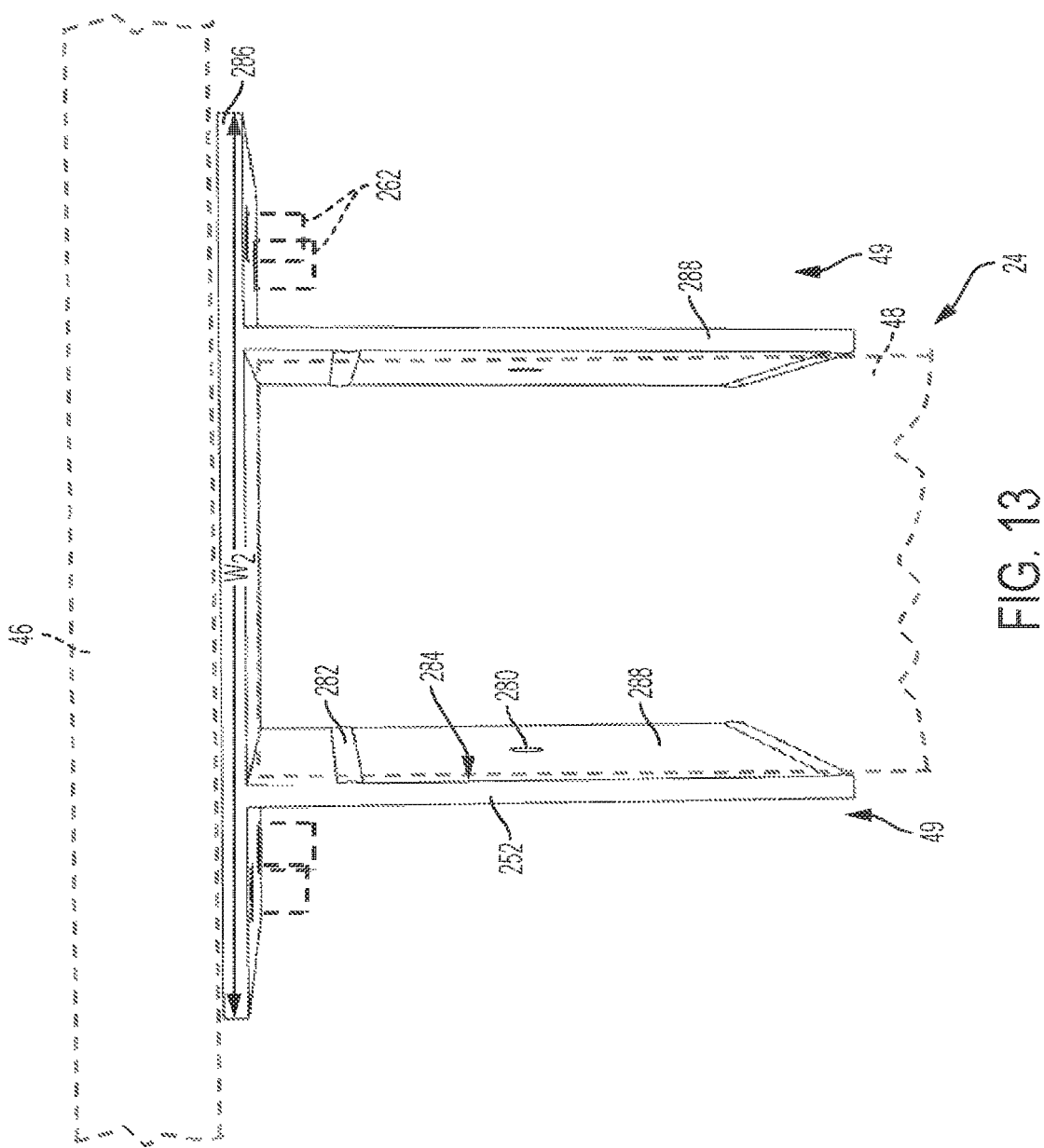
FIG. 13 is a bottom view of the alternative embodiment mounting member of FIG. 12 coupled to a portion of the composite floor assembly and side rail of FIG. 4.

Referring next to FIGS. 12 and 13, an alternative embodiment of mounting member 52 (FIG. 7) is shown as mounting member 252. Mounting member 252 is configured to be positioned generally around an end portion of cross member 48 of composite floor assembly 24. Mounting member 252 includes an outer plate 286 configured to couple with side rail 46 and two legs 288 coupled to outer plate 286 and configured to bond with cross members 48 of composite floor assembly 24. In one embodiment, outer plate 286 has a width, $W_2$, which is greater than a width of cross member 48 such that portions of outer plate 286 extend along recessed portions 49 of composite floor assembly 24 (FIG. 13). Outer plate 286 includes openings 260 for receiving fasteners 262. Openings 260 are positioned at recessed portions 49, rather than at cross members 48, such that fasteners 262 are spaced apart from cross members 48 and do not extend into cross members 48. Openings 260 may have a diameter similar to diameter, D, for openings 60 (FIG. 7). As such, fasteners 262 removably couple side rail 46 to mounting member 252. Alternatively, outer plate 286 may be welded or otherwise coupled to side rail 46.

Legs 288 of mounting member 252 are angled relative to outer plate 286 and, as shown in FIG. 13, may extend generally perpendicularly from outer plate 286. Alternatively, legs 288 may be angled by more or less than 90 degrees from outer plate 286 such that legs 288 extend from outer plate 286 in a tapered configuration. In this way, legs 288 may have a width therebetween less than a width of cross member 48 such that mounting member 252 is frictionally retained on cross members 48.

Referring still to FIGS. 12 and 13, legs 288 also include openings 280 and a plurality of protrusions 282. As such, when mounting member 252 is positioned around the end of cross member 48, protrusions 282 abut cross members 48 of composite floor assembly 24 to define a gap 284 between legs 288 and cross members 48. Legs 288 are bonded to cross member 48 with adhesive (not shown) which is supplied to gap 284 through openings 280. Openings 280 may have a diameter similar to diameter, d, of openings 80 (FIG. 7). As such, legs 288 are bonded to cross members 48 with the adhesive, which may be a structural adhesive, as disclosed herein. Alternatively, legs 288 may be bonded to a shim similar to shim 192 (FIG. 10) for integrally and permanently coupling mounting member 252 to composite floor assembly 24 during the molding process for composite floor assembly 24. Therefore, through the combination of permanently coupling mounting member 252 to composite floor assembly 24 with adhesive and removably coupling side rails 46 to mounting members 252 with fasteners 262, composite floor assembly 24 is not damaged by the assembly of side rails 46 to cross members 48 and side rails 46 are easily removed from composite floor assembly 24 when needed.

Figure 14:
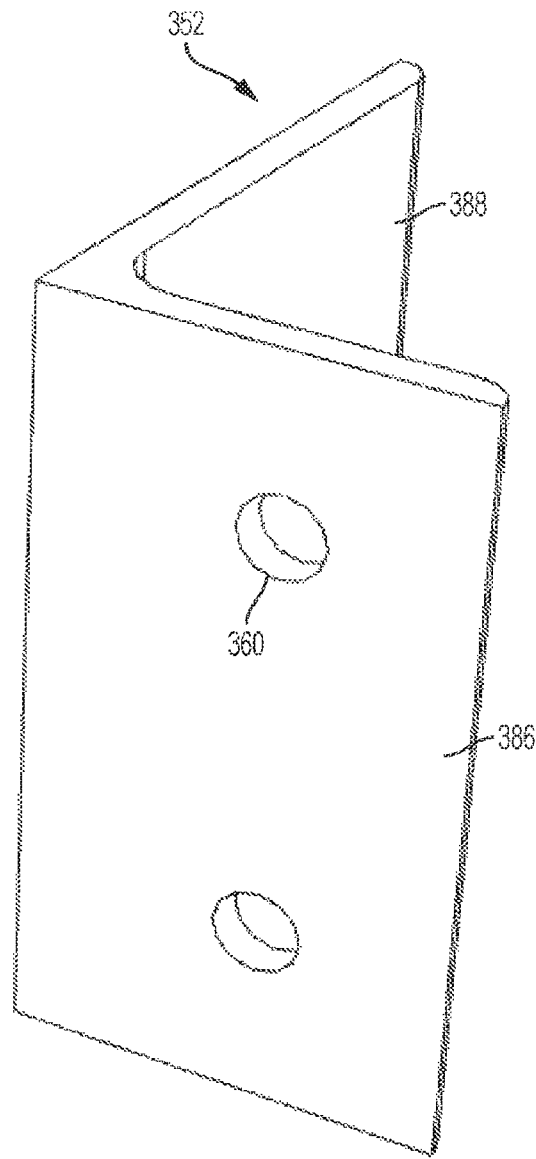
FIG. 14 is a perspective view of another alternative embodiment mounting member of the present application.
Figure 15:
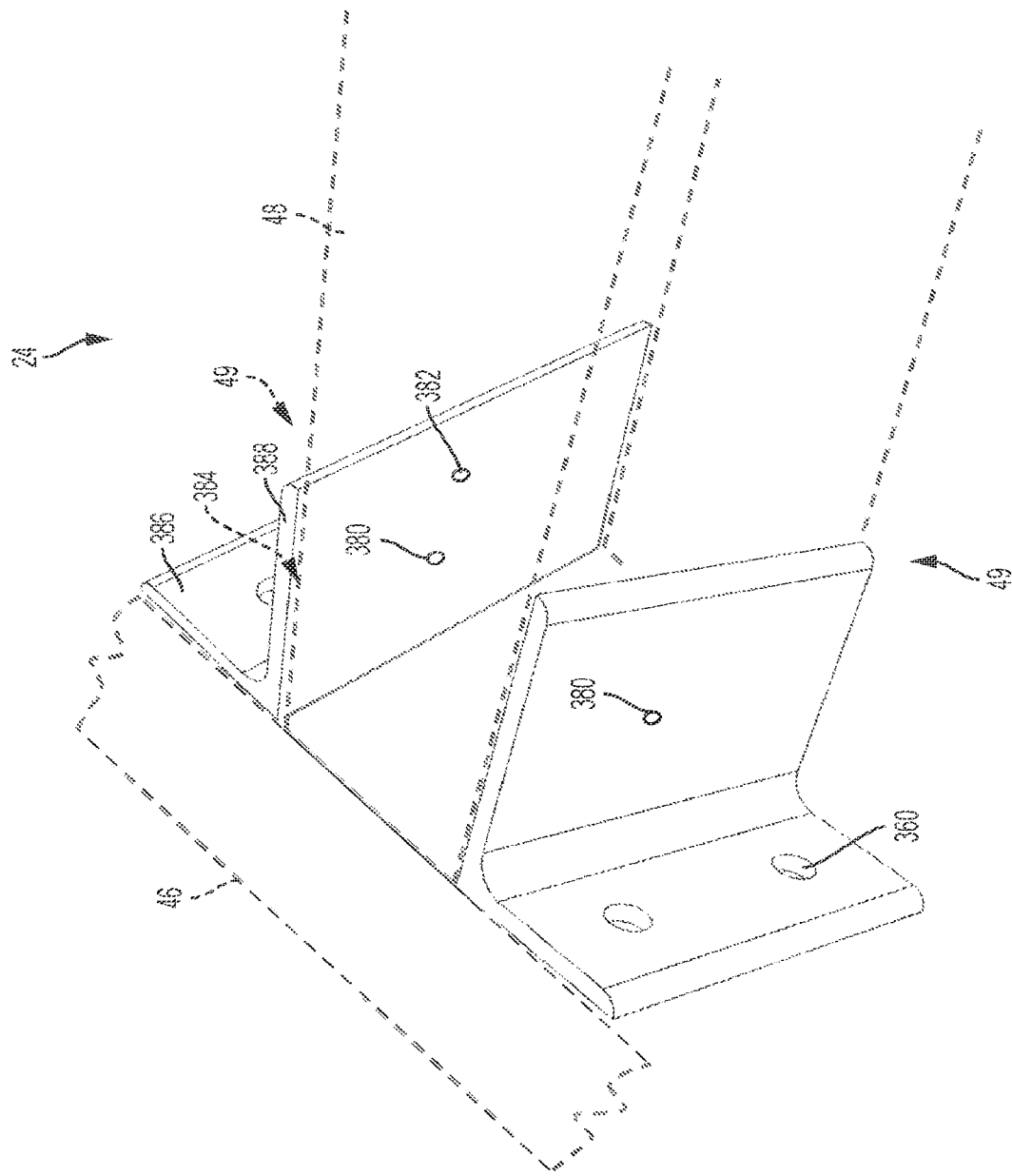
FIG. 15 is a right rear perspective view of two alternative embodiment mounting members of FIG. 14 coupled to a portion of the composite floor assembly and side rail of FIG. 4.

Referring next to FIGS. 14 and 15, an alternative embodiment of mounting member 52 (FIG. 7) is shown as mounting member 352. Mounting member 352 is configured to be positioned within recessed portions 49 and coupled to an end portion of cross member 48 of composite floor assembly 24. Mounting member 352 includes an outer plate 386 configured to couple with side rail 46 and a leg 388 coupled to outer plate 386 and configured to bond with the adjacent cross member 48 of composite floor assembly 24. Outer plate 386 includes openings 360 for receiving fasteners (e.g., bolts, rivets) (not shown). Openings 360 may have a diameter similar to diameter, D, for openings 60 (FIG. 7). As such, the fasteners removably couple side rail 46 to mounting member 352. Alternatively, outer plate 386 may be welded or otherwise coupled to side rail 46.

Leg 388 of mounting member 352 is angled relative to outer plate 386 and, as shown in FIG. 15, may extend generally perpendicularly from outer plate 386. Leg 388 also includes an opening 380 and a plurality of protrusions 382. As such, when mounting member 352 is positioned within recessed portion 49, protrusions 382 abut the adjacent cross member 48 of composite floor assembly 24 to define a gap 384 between leg 388 and cross member 48. Leg 388 is bonded to cross member 48 with adhesive (not shown) which is supplied to gap 384 through opening 380. Opening 380 may have a diameter similar to diameter, d, of openings 80 (FIG. 7). As such, leg 388 is bonded to cross member 48 with the adhesive, which may be a structural adhesive, as disclosed herein. Alternatively, leg 388 may be bonded to a shim similar to shim 192 (FIG. 10) for integrally and permanently coupling mounting member 352 to composite floor assembly 24 during the molding process for composite floor assembly 24. As shown in FIG. 15, multiple mounting members 352 may be bonded to a single cross member 48 to couple side rail 46 to composite floor assembly 24, illustratively one mounting member 352 on each side of cross member 48. Therefore, through the combination of permanently coupling mounting member 352 to composite floor assembly 24 with adhesive and removably coupling side rails 46 to mounting members 352 with fasteners, composite floor assembly 24 is not damaged by the assembly of side rails 46 to cross members 48 and side rails 46 are easily removed from composite floor assembly 24 when needed.

Figure 16:
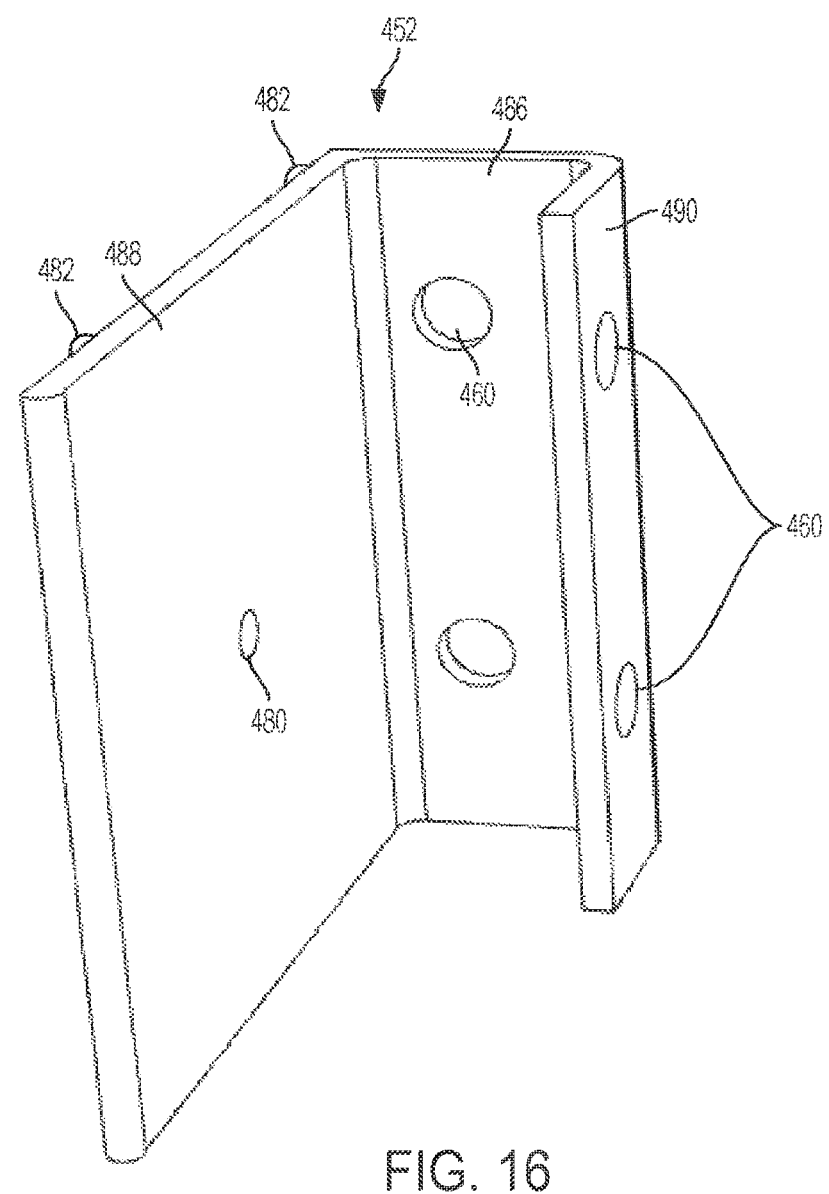
FIG. 16 is a perspective view of another alternative embodiment mounting member of the present application.
Figure 17:
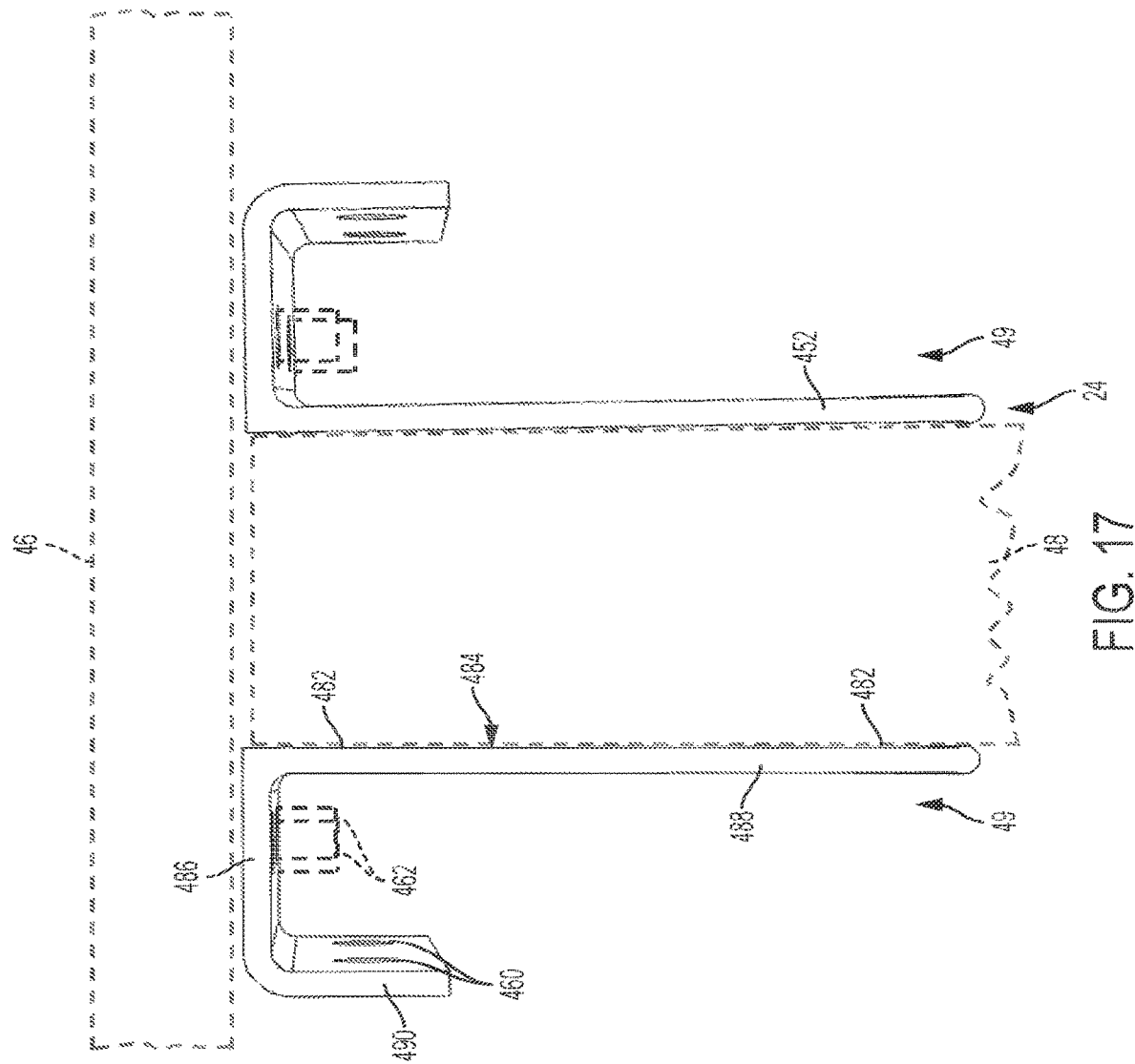
FIG. 17 is a bottom view of the alternative embodiment mounting member of FIG. 16 coupled to a portion of the composite floor assembly and side rail of FIG. 4.

Referring next to FIGS. 16 and 17, an alternative embodiment of mounting member 52 (FIG. 7) is shown as mounting member 452. Mounting member 452 is configured to be positioned within recessed portions 49 and coupled to an end portion of cross member 48 of composite floor assembly 24. Mounting member 452 includes an outer plate 486 configured to couple with side rail 46, a first leg 488 coupled to outer plate 486 and configured to bond with the adjacent cross member 48 of composite floor assembly 24, and a second leg 490 coupled to outer plate 486 and configured to couple with side rail 46 and/or another component of trailer 40. Outer plate 486 and second leg 490 each includes openings 460 for receiving fasteners 462. Openings 460 may have a diameter similar to diameter, D, for openings 60 (FIG. 7). As such, fasteners 462 removably couple side rail 46 to mounting member 452. Alternatively, outer plate 486 may be welded or otherwise coupled to side rail 46.

Legs 488, 490 of mounting member 452 are angled relative to outer plate 486 and, as shown in FIG. 17, may extend generally perpendicularly from outer plate 486. First leg 488 also includes an opening 480 and a plurality of protrusions 482. As such, when mounting member 452 is positioned within recessed portion 49, protrusions 482 abut the adjacent cross member 48 of composite floor assembly 24 to define a gap 484 between leg 488 and cross member 48. Leg 488 is bonded to cross member 48 with adhesive (not shown)) which is supplied to gap 484 through opening 480. Opening 480 may have a diameter similar to diameter, d, of openings 80 (FIG. 7). As such, leg 488 is bonded to cross member 48 with the adhesive, which may be a structural adhesive, as disclosed herein. Alternatively, leg 488 may be bonded to a shim similar to shim 192 (FIG. 10) for integrally and permanently coupling mounting member 252 to composite floor assembly 24 during the molding process for composite floor assembly 24. As shown in FIG. 17, multiple mounting members 452 may be bonded to a single cross member 48 to couple side rail 46 to composite floor assembly 24, illustratively one mounting member 452 on each side of cross member 48. Therefore, through the combination of permanently coupling mounting member 452 to composite floor assembly 24 with adhesive and removably coupling side rails 46 to mounting members 452 with fasteners 462, composite floor assembly 24 is not damaged by the assembly of side rails 46 to cross members 48 and side rails 46 are easily removed from composite floor assembly 24 when needed.

Figure 18:
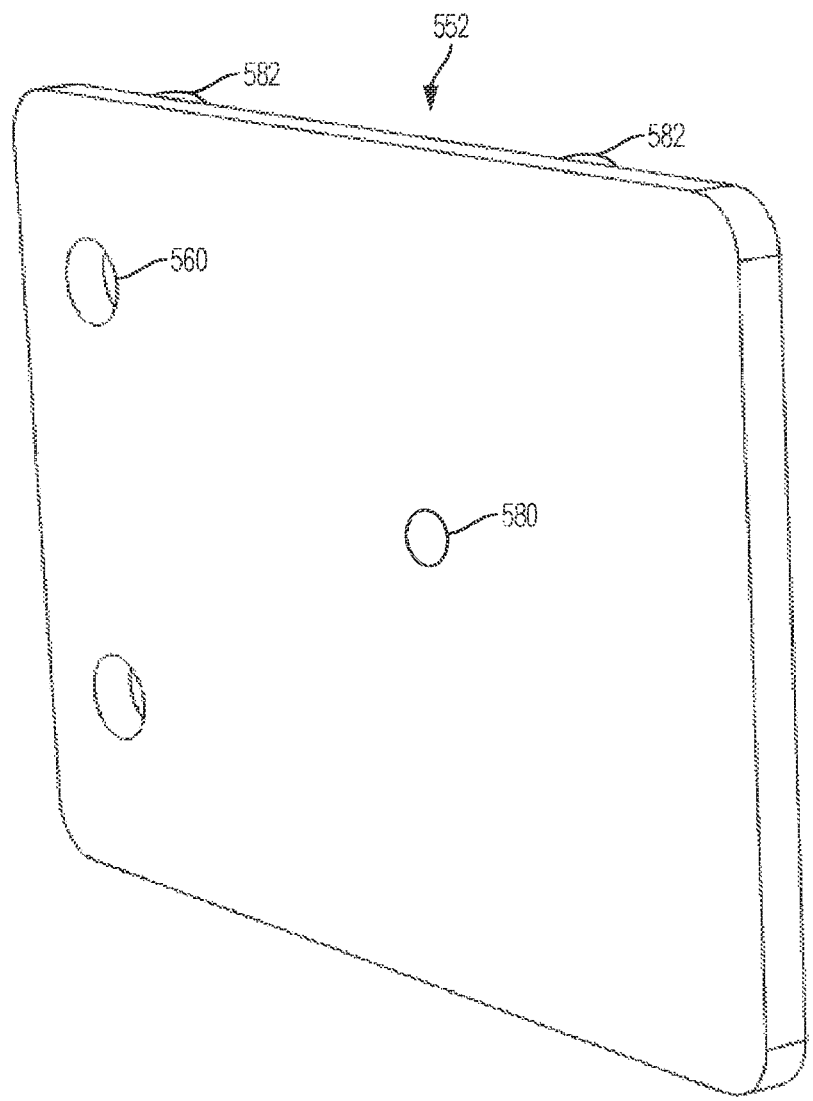
FIG. 18 is a perspective view of another alternative embodiment mounting member of the present application.
Figure 19:
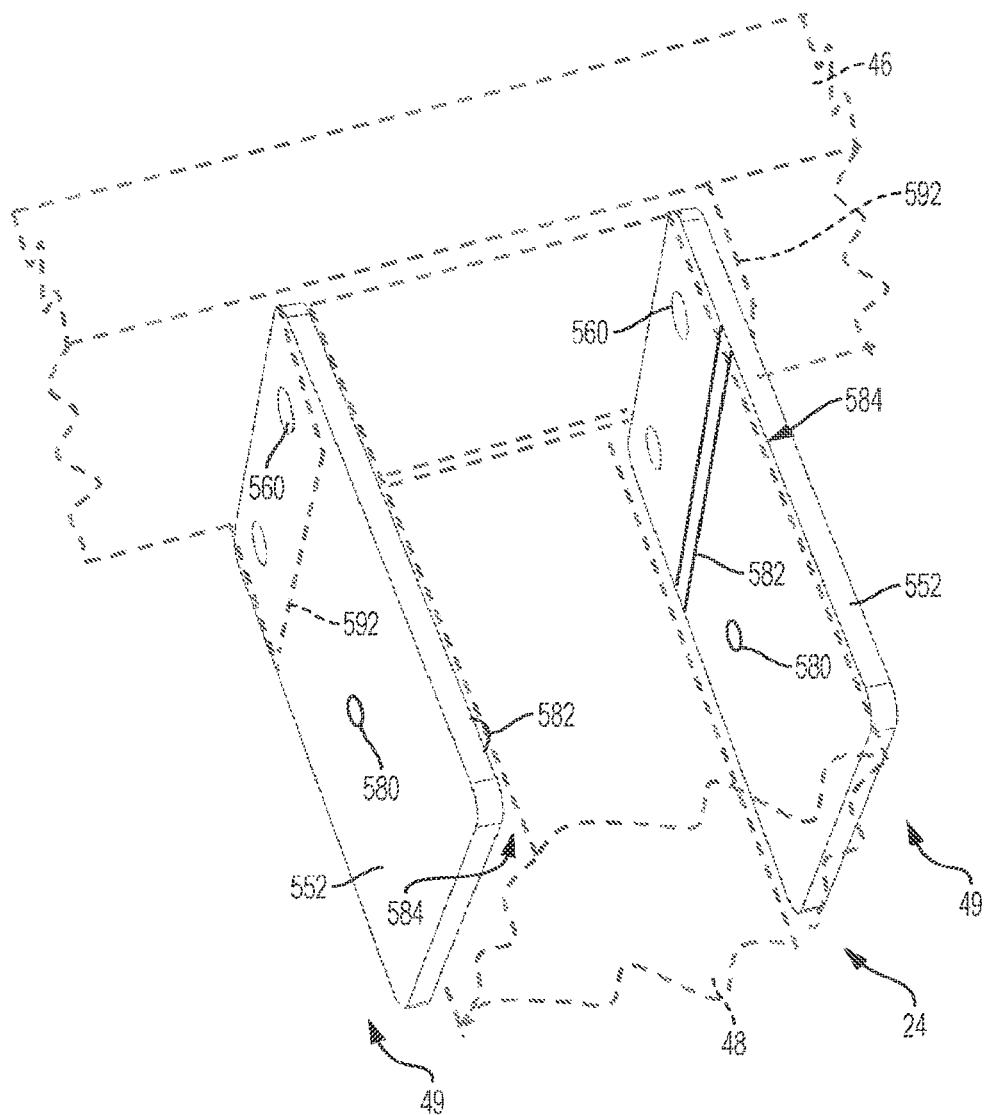
FIG. 19 is a bottom view of the alternative embodiment mounting member of FIG. 18 coupled to a portion of the composite floor assembly and side rail of FIG. 4.

Referring next to FIGS. 18 and 19, an alternative embodiment of mounting member 52 (FIG. 7) is shown as mounting member 552. Mounting member 552 is configured to be positioned within recessed portions 49 and coupled to an end portion of cross member 48 of composite floor assembly 24. Mounting member 552 generally defines a plate with at least one opening 560 for receiving fasteners (e.g., bolts, rivets) (not shown). Openings 560 may have a diameter similar to diameter, D, for openings 60 (FIG. 7). As such, the fasteners removably couple side rail 46 to mounting member 552. More particularly, side rail 46 may include at least one extension 592 extending perpendicularly from side rail 46 and into recessed portion 49 of composite floor assembly 24, as shown in FIG. 19. Extension 592 may be any bracket, plate, or other member coupled to and extending from side rail 46 for securing side rail 46 to composite floor assembly 24. In one embodiment, extension 592 may include a plurality of openings (not shown) which align with openings 560 to receive fasteners and removably couple side rail 46 to composite floor assembly 24. Alternatively, mounting member 552 may be welded to extension 592 of side rail 46.

Mounting member 552 also includes an opening 580 and a plurality of protrusions 582. As such, when mounting member 552 is positioned within recessed portion 49, protrusions 582 abut the adjacent cross member 48 of composite floor assembly 24 to define a gap 584 between mounting member 552 and cross member 48. Mounting member 552 is bonded to cross member 48 with adhesive (not shown) which is supplied to gap 584 through opening 580. Opening 580 may have a diameter similar to diameter, d, of openings 80 (FIG. 7). As such, mounting member 552 is bonded to cross member 48 with the adhesive, which may be a structural adhesive, as disclosed herein. Alternatively, mounting member 552 may be bonded to a shim similar to shim 192 (FIG. 10) for integrally and permanently coupling mounting member 552 to composite floor assembly 24 during the molding process for composite floor assembly 24. As shown in FIG. 19, multiple mounting members 552 may be bonded to a single cross member 48 to couple side rail 46 to composite floor assembly 24, illustratively one mounting member 552 on each side of cross member 48. Therefore, through the combination of permanently coupling mounting member 552 to composite floor assembly 24 with adhesive and removably coupling side rails 46 to mounting members 552 with fasteners, composite floor assembly 24 is not damaged by the assembly of side rails 46 to cross members 48 and side rails 46 are easily removed from composite floor assembly 24 when needed.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains.

What is claimed is:

1. A cargo vehicle comprising:
a composite floor assembly configured to support cargo, the composite floor assembly comprising a front end, a rear end, a left side, a right side, a longitudinal axis extending between the left and right sides from the front end to the rear end, and a plurality of composite support beams extending perpendicular to the longitudinal axis, the plurality of composite support beams being spaced apart to define a plurality of recessed areas between adjacent composite support beams;
a rail extending along the left side or the right side of the composite floor assembly;
a first mounting plate coupled to a front surface of one of the composite support beams, the first mounting plate comprising at least one protrusion positioned adjacent at least one edge of an inner surface of the mounting plate, the at least one protrusion configured to abut the front surface of the corresponding composite support beam to define a gap therebetween, the first mounting plate further defining a port positioned laterally inward of the protrusion, the port configured to receive an adhesive in the gap between the inner surface of the first mounting plate and the front surface of the corresponding composite support beam to permanently couple the first mounting plate to the front surface of the corresponding composite support beam;
a second mounting plate permanently coupled to a rear surface of one of the composite support beams;
a third mounting plate positioned against the rail and extending parallel to the longitudinal axis and perpendicular to the first and second mounting plates; and
at least one mechanical fastener coupling the third mounting plate to the rail, at least a portion of the at least one mechanical fastener located in one of the recessed areas of the composite floor assembly.

2. The cargo vehicle of claim 1, wherein:
the first mounting plate is coupled to the front surface of a rearward composite support beam;
the second mounting plate is coupled to the rear surface of a forward composite support beam; and
the third mounting plate and the at least one mechanical fastener are located between the first and second mounting plates and in the recessed area between the rearward and forward composite support beams.

3. The cargo vehicle of claim 2, wherein the first, second, and third mounting plates form a single mounting member.

4. The cargo vehicle of claim 1, wherein the first and second mounting plates are coupled to front and rear surfaces of the same composite support beam.

5. The cargo vehicle of claim 4, wherein:
the first mounting plate and the third mounting plate form a first mounting member located forward of the composite support beam; and
the second mounting plate and a fourth mounting plate form a second mounting member located rearward of the composite support beam.

6. The cargo vehicle of claim 1, wherein:
the first mounting plate is adhered to the front surface of the corresponding composite support beam; and
the second mounting plate is adhered to the rear surface of the corresponding composite support beam.

7. The cargo vehicle of claim 6, wherein:
an inner surface of the first mounting plate includes a plurality of protrusions configured to abut the front surface of the corresponding composite support beam; and
an inner surface of the second mounting plate includes a plurality of protrusions configured to abut the rear surface of the corresponding composite support beam, the protrusions defining a second gap between the inner surface of the second mounting plate and the rear surface of the corresponding composite support beam.

8. The cargo vehicle of claim 7, wherein:
the second mounting plate includes a second port configured to receive an adhesive in the second gap between the inner surface of the second mounting plate and the rear surface of the corresponding composite support beam.

9. The cargo vehicle of claim 1, wherein each composite support beam includes a foam core surrounded by a fiberglass and polymeric skin.

10. The cargo vehicle of claim 1, wherein the composite floor assembly is a flat-bed floor assembly.

11. The cargo vehicle of claim 10, wherein the rail includes at least one channel configured to receive a retaining member for securing cargo to the flat-bed floor assembly.

12. The cargo vehicle of claim 11, wherein the at least one channel is a winch track.

13. The cargo vehicle of claim 10, wherein the rail is configured to receive a nail strip for securing cargo to the flat-bed floor assembly.

14. The cargo vehicle of claim 1, wherein:
the front end of the composite floor assembly is coupled to a front wall;
the left side of the composite floor assembly is coupled to a left side wall; and
the right side of the composite floor assembly is coupled to a right side wall.

15. The cargo vehicle of claim 14, wherein the rail couples one of the left and right sides of the composite floor assembly to the corresponding left or right side wall.

16. A cargo vehicle comprising:
a composite floor assembly configured to support cargo, the composite floor assembly comprising a front end, a rear end, a left side, a right side, a longitudinal axis extending between the left and right sides from the front end to the rear end, and composite support beam extending perpendicular to the longitudinal axis, the composite support beam having a front surface that faces a front recessed area and a rear surface that faces a rear recessed area;
a rail extending along the left side or the right side of the composite floor assembly;
a first mounting plate coupled to the front surface of the composite support beam, the first mounting plate comprising at least one protrusion positioned adjacent at least one edge of an inner surface of the first mounting plate, the at least one protrusion configured to abut the front surface of the corresponding composite support beam to define a gap therebetween, the first mounting plate further defining a port positioned laterally inward of the protrusion, the port configured to receive an adhesive in the gap between the inner surface of the first mounting plate and the front surface of the corresponding composite support beam to permanently couple the first mounting plate to the front surface of the corresponding composite support beam;
a second mounting plate coupled to the rear surface of the composite support beam, the second mounting plate comprising at least one protrusion positioned adjacent at least one edge of a second inner surface of the second mounting plate, the at least one protrusion configured to abut the rear surface of the corresponding composite support beam to define a second gap therebetween, the second mounting plate further defining a second port positioned laterally inward of the at least one protrusion, the second port configured to receive an adhesive in the second gap between the second inner surface of the second mounting plate and the rear surface of the corresponding composite support beam to permanently couple the second mounting plate to the rear surface of the corresponding composite support beam;
a third mounting plate positioned against the rail and extending forwardly from the first mounting plate through the front recessed area;
a fourth mounting plate positioned against the rail and extending rearwardly from the second mounting plate through the rear recessed area;
at least one front mechanical fastener coupling the third mounting plate to the rail; and
at least one rear mechanical fastener coupling the fourth mounting plate to the rail.

17. The cargo vehicle of claim 16, wherein:
the first mounting plate and the third mounting plate form a first mounting member located forward of the composite support beam; and
the second mounting plate and a fourth mounting plate form a second mounting member located rearward of the composite support beam.

18. The cargo vehicle of claim 16, wherein the third mounting plate and the fourth mounting plate are each removably coupled to the rail.

19. The cargo vehicle of claim 8, wherein the third mounting plate includes a port to receive a mechanical fastener.

20. The cargo vehicle of claim 1, wherein the third mounting plate is removably coupled to the rail.

21. The cargo vehicle of claim 1, wherein the plurality of composite support beams support a platform or panel so that each of the plurality of recessed areas comprise three walls.

22. The cargo vehicle of claim 21, wherein each of the first mounting plate, the second mounting plate, and the third mounting plate are positioned completely within a corresponding recessed area.

* * * * *